US012571162B2

(12) United States Patent
Neuhofer et al.

(10) Patent No.: US 12,571,162 B2
(45) Date of Patent: Mar. 10, 2026

(54) METHOD FOR HOT PRESSING PREFORMS FROM A FIBER-CONTAINING MATERIAL

(71) Applicant: Kiefel GmbH, Freilassing (DE)

(72) Inventors: Heinz Neuhofer, Freilassing (DE); Josef Rehrl, Teisendorf (DE); Thomas Auer, Saaldorf-Surheim (DE); Hubert Rehrl, Teisendorf (DE); Raphael Köppl, Bischofswiesen (DE)

(73) Assignee: Kiefel GmbH, Freilassing (DE)

( * ) Notice: Subject to any disclaimer, the term of this patent is extended or adjusted under 35 U.S.C. 154(b) by 344 days.

(21) Appl. No.: 18/192,085

(22) Filed: Mar. 29, 2023

(65) Prior Publication Data

US 2023/0313458 A1 Oct. 5, 2023

(30) Foreign Application Priority Data

Apr. 5, 2022 (DE) ........................ 102022108094.3

(51) Int. Cl.
*D21F 13/10* (2006.01)
*B30B 9/28* (2006.01)
(Continued)

(52) U.S. Cl.
CPC ................ *D21F 13/10* (2013.01); *B30B 9/28* (2013.01); *B30B 15/02* (2013.01); *D21J 3/00* (2013.01)

(58) Field of Classification Search
CPC ........... D21F 13/10; B30B 9/28; B30B 15/02; B30B 15/22; B30B 15/34; B30B 15/00;
(Continued)

(56) References Cited

U.S. PATENT DOCUMENTS 6,210,531 B1 4/2001 Bradford
2004/0011489 A1* 1/2004 Kimbara .................. D21J 3/10
162/219
(Continued)

FOREIGN PATENT DOCUMENTS

CN 2 477 694 Y 2/2002
CN 101967767 A 2/2011
(Continued)

OTHER PUBLICATIONS

Extended European Search Report in Appl. no. 23159893.9 mailed Sep. 11, 2023, 8 pages.
(Continued)

*Primary Examiner* — Jose A Fortuna
(74) *Attorney, Agent, or Firm* — KOWERT, HOOD, MUNYON, RANKIN & GOETZEL, P.C; Gareth M. Sampson; Dean M. Munyon

(57) ABSTRACT

A tool component, a hot-pressing device and a method for hot pressing preforms from a fiber-containing material are described, wherein the hot-pressing device has a first tool component with a first tool body and at least one first molding device and a second tool component with a second tool body and at least one second molding device. The method includes providing at least one preform made of fiber-containing material, heating the first tool body and the first molding device via a temperature control device, placing a preform on first contact surfaces of the first molding device, moving the second tool component relative to the first tool component, and pressing the first tool component and the second tool component until the first contact surfaces and the second contact surfaces form a closed cavity.

8 Claims, 7 Drawing Sheets

(51) Int. Cl.
*B30B 15/02* (2006.01)
*D21J 3/00* (2006.01)

(58) Field of Classification Search
CPC .... D21J 3/00; D21J 7/00; B29C 43/52; B31D 5/02; B31F 1/00
See application file for complete search history.

(56) References Cited

U.S. PATENT DOCUMENTS

| | | | | |
|---|---|---|---|---|
| 2005/0150624 | A1 | 7/2005 | Toh et al. | |
| 2023/0311375 | A1* | 10/2023 | Neuhofer | B30B 15/34 264/40.1 |
| 2023/0313458 | A1* | 10/2023 | Neuhofer | D21J 3/00 162/226 |
| 2024/0102250 | A1* | 3/2024 | Hahnemann | D21J 3/10 |
| 2025/0034816 | A1* | 1/2025 | Hausmann | D21J 3/00 |

FOREIGN PATENT DOCUMENTS

| | | | | | |
|---|---|---|---|---|---|
| CN | 101967767 | B | * | 2/2013 | |
| CN | 107073744 | A | | 8/2017 | |
| CN | 113 863 056 | A | | 12/2021 | |
| CN | 107073744 | B | * | 1/2022 | B28B 1/265 |
| CN | 116892136 | A | * | 10/2023 | B30B 15/34 |
| DE | 10 2006 058443 | A1 | | 6/2008 | |
| DE | 20 2014 105080 | U | | 1/2016 | |
| DE | 10 2019 127562 | A1 | | 4/2021 | |
| DE | 102023106953 | A1 | * | 9/2024 | B29C 51/343 |
| EP | 1413676 | A1 | * | 4/2004 | D21J 7/00 |
| EP | 1671715 | B1 | * | 7/2016 | B21D 37/16 |
| EP | 4257348 | A1 | * | 10/2023 | B30B 15/34 |
| EP | 4257349 | A1 | * | 10/2023 | B30B 15/34 |
| JP | H09 296397 | A | | 11/1997 | |
| JP | 2019025779 | A | * | 2/2019 | |
| JP | 2024531877 | A | * | 9/2024 | C22F 1/183 |
| WO | WO-03035981 | A1 | * | 5/2003 | D21J 7/00 |
| WO | WO-2023217540 | A1 | * | 11/2003 | D21J 7/00 |
| WO | WO-2005016619 | A1 | * | 2/2005 | B29C 35/049 |

OTHER PUBLICATIONS

Office Action in CN Appl. No. 202310349394.0 mailed Sep. 8, 2025, 8 pages.

* cited by examiner

METHOD FOR HOT PRESSING PREFORMS FROM A FIBER-CONTAINING MATERIAL

CROSS-REFERENCE TO RELATED APPLICATIONS

The present application claims priority under 35 U.S.C. § 119 to German Patent Application No. DE 10 2022 108 094.3, filed Apr. 5, 2022, the disclosure of which is incorporated by reference herein in its entirety.

TECHNICAL FIELD

A tool component for a hot-pressing device, a hot-pressing device and a method for hot pressing preforms from a fiber-containing material are described.

DESCRIPTION OF RELATED ART

Fiber-containing materials are increasingly being used in order to produce, for example, packaging for foodstuffs (for example bowls, capsules, boxes, etc.) and consumer goods (for example electronic devices etc.) as well as beverage containers. The fiber-containing materials generally contain natural fibers, which are obtained, for example, from renewable raw materials or waste paper. The natural fibers are mixed, in a so-called pulp, with water and if necessary further additives, such as e.g., starch. Additives can also have effects on the color, the barrier properties and mechanical properties. This pulp can have a natural fiber content of from, for example, 0.5 to 10 wt.-%. The natural fiber content varies depending on the method which is used to produce packaging etc. and the product properties of the product to be produced.

The production of fiber-containing products from a pulp is usually affected in several work steps. First of all, the pulp is provided in a pulp stock and a suction body with a suction tool, the geometry of which substantially corresponds to the product to be produced, is at least partially dipped into the pulp. During the dipping, a suction is affected via openings in the suction tool, which is connected to a corresponding device, wherein fibers from the pulp accumulate on the suction tool. These fibers are brought into a pre-pressing tool via the suction tool, wherein a preform is produced. During this pre-pressing operation, the fibers are pressed to give the preform and the water content of the preform is reduced.

In a subsequent work step the preform is generally pressed in a hot press to give the finished product. Here, the preform is introduced into a hot-pressing tool which has a lower tool half and an upper tool half which are heated. In the hot-pressing tool, the preform is pressed in a cavity with heat input, wherein due to the pressure and the heat residual moisture is extracted, with the result that a preform having a residual moisture content of approx. 60 wt.-% only has a residual moisture content of, for example, 5 wt.-% after the hot pressing. The steam forming during the hot pressing is extracted by suction during the hot pressing via openings in the cavities and channels in the hot-pressing tool. For this, an extraction device is provided which generates a relative vacuum. The extraction by suction is usually affected via the lower tool half. For this, a vacuum pump or another device with a corresponding action is provided and fluidically connected to the openings in the cavities.

A hot-pressing tool and a production method with the above-described hot-pressing method are known, for example, from DE 10 2019 127 562 A1.

During the hot pressing it is crucial to heat the preforms, which have a relatively high-water content, strongly enough and to press them for long enough in order to achieve the desired residual moisture in the finished product and to press the fibers. For this, very long takt times are generally run for each hot-pressing operation, in order to ensure that all preforms received in a hot-pressing tool have the required maximum residual moisture content.

Too long a pressing, however, is to the detriment of the takt time, which is then longer than actually necessary. If the takt time is chosen to be too short, it is not possible to heat and press all preforms in a hot-pressing tool sufficiently, with the result that some of the hot-pressed preforms have to be discarded as waste because these preforms are too moist and/or damaged. Possible damage occurs, for example, because preforms that are too moist remain "stuck" to the upper hot-pressing tool and/or at least partially tear when the hot-pressing tool is opened.

It has been found that, in particular when a hot-pressing tool has several cavities into which preforms are introduced, the cavities heated at the start via temperature control means as well as the tool component at least partly forming the cavities are subject to temperature fluctuations of different strengths during the hot pressing. Thus, for example, the high-water content of the preforms has a decisive influence on the temperature of contact surfaces of the cavities. As the preforms can have different water contents before the hot pressing, a "cooling" of the cavities and the hot-pressing tool of different strengths can consequently also occur. Here, it has also been found that in particular the surface temperature of the contact surfaces of the cavities varies considerably for each cavity, namely depending on the position of the cavities in the hot-pressing tool.

Furthermore, it has been found that, if the closing speed of the hot-pressing tool, i.e., the speed at which the two tool components of the hot-pressing tool are displaced relative to each other, is not adapted to the release of water from the preform, less water can form than can evaporate (locally), with the result that the energy removed is not sufficient to cool the surface temperature to boiling temperature (surface temperature>boiling temperature) and thus cycle time is "wasted".

In addition, the closing speed cannot be adapted to the water formation within the cavities, with the result that more water is released than can evaporate (locally) in a predefined time window, wherein the heat energy removed from the cavities allows the surface temperature of the contact surfaces in the cavities to cool to below the characteristic boiling temperature of the fibrous material at the prevailing pressure (surface temperature<boiling temperature). Thus, the takt time/cycle cannot be utilized effectively, as the surface of the cavities cools too strongly. As a result, the takt time would have to be increased.

Furthermore, the steam formation can happen too quickly due to closing speeds that are too high and can produce local "steam cushions". Here, due to a spherical spread of steam to all sides in closed local spaces within the cavities, associated with an increase in pressure, a preform received therein can rupture. Further, the steam cannot escape through the openings present quickly enough due to "blockage" and an increase in pressure can also result in a higher boiling temperature of the water or the liquid carried into the preform from the pulp, as a result of which the finished product seems "wetter" as energy cannot be withdrawn from the surface of the cavity evenly. "Blockage" denotes a plugging or sealing of the openings and/or the channels, if, for example, more steam forms than can be discharged.

SUMMARY OF DISCLOSED EMBODIMENTS

Problem

There is therefore an enormous potential for improvement in the production of products from a fibrous material, in particular with respect to the hot-pressing method step and the tools required for it. Hitherto, with the known means and methods, it has not been possible to carry out the above-named problems with respect to an adequate heating of the preforms with a correspondingly short takt time, wherein the waste is reduced.

The problem is therefore to specify a hot-pressing tool and a method which provide hot-pressed preforms (finished products) from a fibrous material which do not exceed a pre-definable residual moisture content, wherein no waste is produced or at least the waste is reduced compared with known methods and hot-pressing tools. Moreover, the takt time is to be optimized such that no resources in terms of time, energy and material conversion are wasted.

Solution

The above-named problem is solved by a tool component for a hot-pressing device, having a first tool body, wherein the first tool body has, on at least one side, at least one first molding device, which has first contact surfaces for a preform to be received, wherein the first tool body includes a thermally conductive material and has first temperature control means (e.g., devices), which are configured to heat the first tool body and the at least one first molding device, wherein the at least one first molding device has, on the first contact surfaces for a preform to be received, first openings, which open into at least one first channel in the first tool body, wherein the at least one first channel from the first openings opens into at least one first connection, wherein at least one second opening is provided, which provides a fluidic connection to the first openings of the at least one first molding device separate from the at least one first connection.

It has generally been found that the surface temperature of cavities which are formed between the first contact surfaces and second contact surfaces of at least one second molding device formed complementary, and in particular the surface temperature of first and second contact surfaces, drops sharply, irrespective of the temperature level at the beginning of a cycle, because of the excess water or liquid or fluid from a pulp of a preform forming due to the closing force. A hot-pressing device with a hot-pressing tool which has a first tool component (e.g. lower tool half) and a second tool component (e.g. upper tool half) thus cannot be used effectively for the time in which the surface temperature of the contact surfaces of at least one cavity falls below a level which is crucial for the hot-pressing process, because excess water cannot evaporate. The first tool component and the second tool component can be formed such that the cavities close tightly during the hot pressing. Energy can thus be saved during the hot pressing, because steam, for example, does not escape and result in a cooling of cavities. For this, a first molding device and a corresponding second molding device can be formed correspondingly and pressed together correspondingly strongly during a hot-pressing operation. In further embodiments, a local leak can deliberately be provided in order thus to produce a second opening between a first molding device and a second molding device in a cavity, which as a result provides, for example, a "secondary air stream" during the extraction by suction of steam forming in the cavity.

In the hot-pressing tool, a cavity is formed between first contact surfaces of a first molding device in a first tool component and corresponding second contact surfaces of a second molding device in a second tool component.

During the pressing of a first tool component and a second tool component of a hot-pressing tool, excess water or fluid forming from the pulp of the raw product (preform) hits the surface/contact surfaces of the cavity and evaporates when the surface temperature is sufficiently high, which can also result in a brief drop in the temperature level. After that, the immediately surrounding capacity of the material of the tool component feeds the regions close to the surface and thus very quickly brings the contact surfaces back to an average level corresponding to the required overall performance. For this, the first tool body and the molding devices can for example include a metal or a metal alloy, and they have very good thermal conductivity properties. For example, the first tool body and the at least one first molding device include aluminum, wherein other metals and metal alloys are also suitable. When selecting the material, the temperatures to be reached, the storage capacity (capacity) of the material and the composition of the pulp and its component parts are to be taken into consideration, among other things. The first tool body and the at least one molding device can for example also have a coating, which can be used to protect the surfaces against damage and/or interaction with the pulp/water and/or with one of the component parts of the tool device as well.

For example, sensor elements on the surface of the first tool body and/or the first contact surfaces of the at least one first molding device can also be protected by a coating. The properties of the coating can also be adapted to requirements of the tool.

Furthermore, the at least one molding device can be an integral component part of the first tool body. Thus, for example, the at least one molding device can be formed as an elevation or depression in the first tool body and can form a negative or positive of the products to be manufactured.

In further embodiments, the at least one first molding device can be removably connected to the first tool body. For this, both the first tool body and the at least one first molding device have corresponding fastening means. For example, a connection of at least one first molding device to the first tool body can be effected via screws via the fastening means of the first tool body and the at least one first molding device. Fastening means can be, for example, openings with or without a thread, bolts, hooks, rails, etc.

Conventionally, a hot-pressing tool and an associated tool component have several molding devices or cavities, with the result that a corresponding number of products can be manufactured simultaneously in one hot-pressing operation. In the case of several cavities or molding devices, the above-named problems increasingly come to the fore, with the result that a different steam generation and, therefore, also a "blocking" can occur, for example due to preforms with different levels of moisture and position-dependent temperature fluctuations on the surfaces of the cavities or molding devices as well as the different pressures and temperatures resulting therefrom. Furthermore, several first channels can be provided in the first tool component, which have flow paths of different lengths up to an extraction device, with the result that the conditions in the cavities and the first channels are additionally influenced hereby.

The specified tool component offers a solution to the above problems through the at least one second opening, which is fluidically connected to the first openings of the at least one first molding device separate from the at least one first connection, in particular in the case of several first molding devices or cavities, with the result that no "blocking" occurs in the cavities and the boiling temperatures for the fluid are aligned in the different cavities via the pressure equalization in all cavities. Thus, different boiling temperatures do not occur in the cavities due to large pressure differences, with the result that the temperature difference brought about locally in the cavities, which originates from the position of the cavities on the tool body and in dependence on the proximity of the cavities, is hereby not intensified and thus has a smaller influence on the hot pressing. Thus, the solution proposed herein offers the possibility of defining the takt time for a hot-pressing operation, which is long enough for all preforms which are manufactured at the same time, with the result that no takt time is wasted.

Via the first openings, (gaseous or liquid) fluid from the pulp forming during a hot-pressing operation can be extracted by suction or otherwise discharged via the at least one first channel. The fluid is generally water, which evaporates on the hot surfaces of the cavities. Steam is thus usually discharged from the cavities. For this, a corresponding device (e.g., vacuum pump) can be connected to the first connection. The discharging of the fluid, wherein the term fluid comprises both gaseous and liquid substances and in addition represents water as well as an aqueous solution from the pulp, can for example be effected at a pressure below the ambient pressure. For example, the vacuum provided hereby can have an absolute pressure of from 0.2 to 0.9 bar. During the discharging of, for example, steam via the first openings, the at least one second opening provides a fluidic connection to the environment, a gas or gas mixture storage device, or a device (pump, radial compressor, etc.) for the provision of gas or gas mixture. Thus, not only is the gaseous and/or liquid fluid extracted by suction from the cavities, but also gas or a gas mixture, for example ambient air, is also sucked in. This has the result that the pressure in the at least one first channel as well as in all cavities aligns with the ambient pressure or the gas or gas mixture pressure, which can deviate from the ambient pressure depending on the manner of provision (for example due to a provision by a compressor etc.).

The fluidic connection between a second opening provided in the connection region between a first molding device and a second molding device, which is for example formed by a slot, and the first openings is also present, according to the definition chosen here, when a "closed" connection is first present in the closed state of a first tool component and a second tool component. This means that a connection, in the case of a tool component, also exists via the surface of the first molding device along the contact surfaces. The at least one second opening can be formed by a depression in a contact region of the first molding device and/or of a second molding device formed complementary thereto, with the result that the at least one second opening thus does not require a closed edge.

The extraction by suction of fluid via the first openings in the first contact surfaces or from the at least one cavity can be affected at various pressures because gas, gas mixture or ambient air is additionally sucked in. For example, because gas, gas mixture or ambient air is also sucked in, the extraction by suction via the at least one first connection can be affected at a slight negative pressure (<1 bar).

Overall, through the provision of a secondary stream of gas or gas mixture, wherein gas mixture also comprises ambient air, it is achieved that no "blocking" occurs, because for example more "steam volume" can be removed from the cavities than at a conventionally present negative pressure.

Thus, for example, in the case of volume flows close to ambient pressure (approx. 1 bar), more "steam volume" can be removed than at negative pressure (for example 0.5 bar). If the secondary stream of gas or gas mixture is provided at a higher pressure (>1 bar), an even greater potential for discharging or extracting by suction, for example, steam from the cavities results. The water saturation of the secondary stream is, among other things, crucial for this. The lower the saturation is, the more water can be taken up from the cavities and thus discharged or extracted by suction. In addition, the ability to discharge as much water evaporating on the hot contact surfaces of the cavities as possible per unit of time is increased if the quantity of gas or gas mixture via the secondary stream or the pressure at which the gas or gas mixture is provided is increased.

The enthalpy of evaporation of the fluid from the pulp (in particular water) is substantially independent of the temperature level in the cavities and many times higher than the energy of heating up to the evaporation temperature. Consequently, it is advantageous to discharge the forming steam with as much effective pressure as possible.

Overall, an alignment of the boiling temperatures in the cavities of a hot-pressing tool, with a pressure equalization in the discharge channels (at least one first channel), is achieved through the tool component described herein, wherein the volume of fluid discharged from preforms is increased considerably without adversely affecting the cycle time/takt time. The solution presented here provides a significant improvement during the hot pressing and thus the final manufacture of products from fibrous materials with a relatively small amount of effort.

The first connection of the first channel can be implemented differently. Thus, the first connection can have only one connection to a further channel outside the first tool body. In further embodiments, the first connection can have connecting elements for coupling to corresponding connecting elements. In further embodiments, the at least one first connection can also have a valve, which can be regulated for the extraction by suction and for the provision of a vacuum.

The at least one second opening can be provided in the first tool body and/or in the at least one first molding device. As already stated above, the at least one second opening can be formed as a depression in a contact region of a first molding device, which, when connected to a second molding device, provides a fluidic connection between this opening and the first openings of the associated first contact surfaces. The design of such second openings comprises relatively small circular, oval or slot-like openings. The opening width of such second openings, as for other second openings, is to be determined such that the provided secondary stream of gas or gas mixture within the cavities does not cause a collapse of the conditions prevailing there. As the conditions depend on the dimensions of the products to be manufactured and thus of the cavities, the moisture content of preforms and the takt time as well as the media involved therein, a limitation of the conditions, in particular temperature and pressure, which in turn are used for the dimensioning of the second opening cannot be sweepingly identified by an opening width of the second openings. However, it follows that the opening width of the at least one second opening depends hereon and is to be determined correspondingly. The at least one second opening can furthermore, for example, also be provided in the first tool body and fluidically connected to the at least one first channel and/or the first openings.

In further embodiments, the first tool body can have at least one second channel, which is fluidically connected to the at least one first channel and the at least one second opening. In still further embodiments, the at least one second channel can be fluidically connected via at least one second connection in the first tool body to the environment, a storage device for gas or gas mixture or a device for providing a secondary stream of gas or gas mixture (e.g. compressor).

The at least one second connection can be implemented differently from a first connection and formed as an opening, for example. Connecting elements, which make a coupling to a valve possible, can also be provided on the at least one second connection. In further embodiments, connecting elements themselves can form a second connection.

In addition, in further embodiments, the at least one second opening can be connected to the environment, a gas storage device or a device for providing gas or a gas mixture.

In further embodiments, the tool component can have at least one regulating element for adjusting the opening width of the at least one second opening. Regulating elements are used to regulate the quantity of secondary stream supplied. Depending on the embodiment, regulating elements can be implemented, for example, as valves or, for example, as diaphragms.

In further embodiments, the at least one second opening and/or the at least one second channel can have at least one valve, via which it is possible to control the quantity of secondary stream of gas or gas mixture supplied. An adaptation to various measured or ascertained conditions in the cavities and/or channels in the tool body, various moisture contents of the preforms and/or various cavities for corresponding products can thus be set. A second connection can also be connectable to a valve or have a valve.

The quantity of gas or gas mixture (e.g., ambient air) sucked in can be regulated hereby. It is thus essentially possible to influence how much fluid (for example steam) is discharged. In particular, in the case of a continuous monitoring of a hot-pressing process, the quantity of fluid discharged, the temperatures in the cavities and thus the boiling temperatures and the pressures in the channels or cavities of the tool component can be constantly regulated and adapted to predefined optima with respect to the takt or cycle time.

In still further embodiments, a regulating element can for example be implemented as a diaphragm, which is arranged slidably on the first tool body and itself has at least one opening which lies in a neutral location congruent with the at least one second opening. If the diaphragm is slid or otherwise displaced (e.g. twisting, tilting, etc.), the opening width of the at least one second opening changes. For example, in embodiments with several, in particular parallel, second channels, wherein the associated second openings are arranged on one side of the first tool body, a diaphragm with corresponding openings can be arranged slidably. At the same time, a change in the opening width of all second openings can then be effected simultaneously through the sliding of the diaphragm. This can for example be effected in order to adapt the opening width of the second openings to new products or cavities or to alterations of conditions in the cavities and/or properties of preforms. The sliding of a diaphragm can be carried out manually by an operator, wherein, for this, locking means (e.g. screws) are for example loosened and locked in place again after the readjustment, or can be effected by means of a motor. An actuation by means of a motor can for example be effected according to measured, detected and/or calculated conditions and/or parameters.

In further embodiments, the hot-pressing component can have several second channels, which run within the first tool body. As a result, a relatively large quantity of fluid can for example be discharged in a short period of time compared with a conventional embodiment of a tool body with only one first channel and embodiments with only one second channel. Furthermore, a "blocking" is further reduced and it is also ensured, in the case of a strong steam formation, that the channels in the tool body have sufficient volume for variable volumes of fluid or steam. Furthermore, it is thus also ensured that the boiling temperatures in the cavities and the pressures in the channels align with each other or reach the same level.

In further embodiments, the second channels can run parallel to each other. Furthermore, the second channels running parallel to each other can be connected to each other via connecting lines, which for example run transverse to the second channels. As a result, it is ensured that gas or gas mixture (e.g. ambient air) sucked in can reach individual cavities of the tool component in sufficient quantity in order to be able to discharge fluid (for example steam) without an increase in pressure briefly occurring in the channels. For example, a very large quantity of steam can form quickly during the hot pressing. The channels in the tool body are generally formed such that they have relatively small diameters (for example in the range of from 1 to 5 mm), with the result that only a limited quantity of steam can be discharged per unit of time. The diameters of the second channels cannot be chosen to be of any desired size for reasons of heat storage capacity, because otherwise too strong a cooling of the second channels would occur due to sucked-in ambient air, which is for example at 20° C. in the case of usual room temperatures, or due to a gas/gas mixture with a temperature greatly deviating therefrom, which would consequently result in a cooling of the tool body and thus the first molding devices, wherein the tool body and the first molding devices are operated, for example, in a temperature range of from 150 to 250° C. The more strongly the channels are connected to each other, the more it can be ensured, even in the case of brief steam peaks, that a sufficient quantity of steam is discharged, and local pressure peaks do not occur in the cavities or in the channels. A local increase in the boiling temperature in individual cavities is thus also avoided.

In further embodiments, the channels running in the tool body for discharging fluid (e.g. steam) escaping from preforms can have a diameter increasing in size towards the first connection. Specifically in embodiments with several cavities, generally several channels, which end in a common first channel which has a first connection, run in the tool body. Per unit of time the common first channel has to discharge a much larger volume of evaporating fluid from the cavities than individual channels, with the result that correspondingly larger diameters are necessary. The diameters can be designed according to the formation of the tool body and the number and shape of the cavities or molding devices.

The above-named problem is also solved by a hot-pressing device with at least one first tool component according to one of the embodiments described above and at least one second tool component, wherein the second tool component has a second tool body made of a thermally conductive material and the second tool body has, on at least one side, at least one second molding device, which is formed complementary to the at least one first molding device and has second contact surfaces for a preform to be received, with the result that in each case one cavity for a preform to be received is formed between the first contact surfaces of the at least one first molding device of the first tool component and the second contact surfaces of the at least one second molding device of the second tool component when the first tool component and the second tool component are pressed against each other for the hot pressing of preforms.

The first tool component and the second tool component are formed such that they have corresponding molding devices, which, in the closed state, form cavities for the preforms for the pressing. Furthermore, the first tool component and the second tool component can be formed substantially similar, wherein the first tool component and the second tool component can for example include the same materials and have an identical coating.

A hot-pressing device formed in such a way makes it possible to mold products starting from preforms in a hot-pressing process, wherein the takt times/cycle times are kept short, and the preforms/products are manufactured in the predefined scope, i.e. have a maximum residual moisture, and no "blocking" occurs during the production. This is achieved, as described above, in that, during the hot pressing, when fluid (e.g. steam) is extracted by suction a gas, a gas mixture or ambient air is additionally supplied via at least one second opening of the first tool component. A pressure equalization is thus effected in the channels of the first tool body, and the boiling temperatures in different cavities align with each other. In addition, a larger volume of fluid (e.g. steam) can also be discharged.

Both the at least one first molding device and the at least one second molding device can, like the first tool body and the second tool body, include a material having very good thermal conductivity properties and also be correspondingly resistant to damage due to the fibers and the pulp as well as the steam escaping. In particular, metals and metal alloys come into consideration as material. For example, the at least one first molding device and the at least one second molding device can include aluminum.

In further embodiments, the second tool component can have second temperature control means (e.g., devices), which are configured to heat the second tool body and the at least one second molding device. Via the second temperature control means a heating of the second tool component is effected in addition to the heating of the first tool component. The first tool component and the second tool component can be brought substantially to the same temperatures or to different temperatures. A targeted heating of preforms within the cavities can thus be achieved. In addition, it is hereby possible for example to take into account the circumstance that preforms are first put on the first contact surfaces or the second contact surfaces, which results in a cooling of these contact surfaces due to the liquid (water) contained in the preforms. For example, these contact surfaces can therefore be heated more strongly, so that, during the hot pressing, when the first tool component and the second tool component are pressed against each other, a substantially equal amount of thermal energy can be introduced on both sides of the preforms within the cavities.

The first temperature control means and/or the second temperature control means can for example comprise heating cartridges, which are introduced in the first tool body and/or in the second tool body. The formation of the temperature control means and the number of heating cartridges are determined by the formation of the tool components (dimensioning, material) and the number of molding devices as well as the formation thereof (size, volume).

In further embodiments, the first temperature control means and/or the second temperature control means can also have other heating devices, which are formed for heating the first tool body and/or the second tool body as well as the molding devices arranged thereon.

In further embodiments, in a method for regulating a hot-pressing device with a hot-pressing tool having a first tool component and a second tool component, the temperatures of the first tool component and the second tool component can be adapted during operation of the hot-pressing device. For this, values detected during the hot pressing can, for example, be taken into consideration. In addition, values which have been detected after a hot-pressing operation and before a hot-pressing operation can also be used. Furthermore, values and data of the components and substances involved in the process ascertained or provided in advance can also be used for this. Such values can be, for example, the temperature in the hot-pressing tool, in particular the temperature in the cavities and in the process the surface temperature of the first contact surfaces and/or the second contact surfaces, the pressure within the cavities, the at least one first channel, the at least one second channel, the at least one third channel and/or the at least one further channel in the second tool body, the weight of preforms/finished products, the energy required for heating the first tool body and/or the second tool body, the temperature of the secondary stream of gas or gas mixture (e.g. ambient air) supplied, the temperature of the gas or gas mixture supplied or of the fluid discharged from the hot-pressing tool, the composition of the pulp, the electrical conductivity of preforms/finished products and/or reference values, wherein the reference values relate, for example, to the core temperature of a tool body or a temperature underneath and in direct proximity to the contact surfaces in the cavities. The reference values are then used to draw a conclusion about the surface temperature on the contact surfaces. Thus, it can for example be ascertained in advance what temperature prevails in a tool body in the case of the cavities on the contact surfaces at a distance of, for example, 5 mm underneath the surface. At the same time, the actual surface temperature is measured via a separate measuring device. The corresponding surface temperatures on the contact surfaces can be determined for several reference values (temperatures in the tool body). This offers the possibility of drawing a conclusion about the temperatures prevailing on the surfaces of the contact surfaces during a hot-pressing operation via temperature sensors which are installed underneath the contact surfaces in the tool body. Here, corresponding reference values can also be ascertained in advance when moist preforms are placed on the contact surfaces, in order to take the effect on the surface temperature into consideration for the reference values.

In further embodiments, on the second contact surfaces for a preform to be received, the at least one second molding device can have third openings, which open into at least one third channel in the second tool body, wherein the at least one third channel from the third openings opens into at least one third connection. This offers the possibility of discharging fluid escaping from the preforms from both sides. For this, in further embodiments a suction device can for example be connected via the third connection. This can be the same suction device as for the first connection. Furthermore, analogously to the at least one second channel in the first tool body, an additional channel can also be provided in the second tool body, via which a gas, a gas mixture or ambient air is supplied. The formation of "air cushions" on the two contact surfaces can thus be prevented, as fluid escaping can always be discharged, and cannot block the cavities on both sides of a preform.

Sensor elements which are used for the temperature detection can be arranged on the surface of the first contact surfaces and/or the second contact surfaces. Several sensor elements can in particular be provided in various positions on the molding devices, in order to detect the temperatures locally prevailing in the cavities and in order then, thus in further embodiments, also to control the closing speed, the takt time, the tool heating by the temperature control means and the location of valves as well as, where appropriate, the performance of an extraction device or a feed device for the supply of the secondary stream of gas or gas mixture.

In further embodiments, sensor elements can additionally or alternatively be arranged underneath the surface for determining the surface temperatures of the contact surfaces in the cavities, which detect temperature reference values which in turn represent corresponding surface temperatures on the contact surfaces ascertained in advance. The smaller the distance of a sensor element from the surface is, the smaller the difference between the actual surface temperature and a reference temperature below the surface temperature in the tool body is. For example, sensor elements for the temperature detection can be arranged a few millimeters, for example in the range 1 to 5 mm, underneath the surface. The closer to the surface the sensor elements are arranged, the quicker temperature changes can be detected, which is important in particular when the surface temperature of the contact surfaces drops when moist preforms are introduced and when fluid/water is squeezed out at the beginning of a hot-pressing operation. In the case of larger distances of sensor elements from the surfaces of the contact surfaces, sensor elements would also be sluggish in the case of tool bodies with a relatively high thermal conductivity and would thus detect temperature changes relatively late.

In further embodiments, at least one second opening can be formed in a contact region between the at least one first molding device and the at least one second molding device. For this, the corresponding contact regions of the at least one first molding device and the at least one second molding device can, in sections, have depressions for example, which, in the state where a first molding device and a second molding device are connected to each other, together form an opening, which is formed partly by the region of the at least one first molding device surrounding the opening and partly by the region of the at least one second molding device surrounding the opening. In still further embodiments, the at least one second opening can also be formed by a depression in the connection region of the at least one first molding device or in the connection region of the at least one second molding device.

Furthermore, second openings can also be arranged underneath a connection region of at least one first molding device and/or at least one second molding device. Such second openings can also extend around a first molding device and/or around a second molding device at regular or irregular intervals.

Furthermore, the above-named problem is also solved by a method for hot pressing preforms from a fiber-containing material using a hot-pressing device according to one of the above embodiments, wherein a first tool component has a first tool body and at least one first molding device and a second tool component has a second tool body and at least one second molding device formed complementary to the at least one first molding device, having the following steps:

- providing at least one preform made of fiber-containing material,
- heating at least the first tool body and the at least one first molding device via at least one first temperature control means,
- placing the at least one preform on the first contact surfaces of the at least one first molding device,
- moving the second tool component relative to the first tool component, wherein the at least one preform comes into contact with the second contact surfaces of the at least one second molding device,
- pressing the first tool component and the second tool component until the first contact surfaces and the second contact surfaces form a closed cavity, wherein residual moisture evaporating due to the heat input generated via the first temperature control means and the pressure generated by pressing the first tool component and the second tool component is discharged by the extraction device from the at least one first preform via at least the first openings, the at least one first channel and the first connection, wherein a gas or gas mixture with a water saturation that is different from the steam extracted by suction is introduced during the discharging of the evaporating residual moisture via at least one second opening which provides a fluidic connection to the first openings of the at least one first molding device separate from the at least one first connection.

A gas or a gas mixture (e.g. ambient air) can also be sucked in by an extraction device during the discharging of the evaporating residual moisture via the at least one second opening, which is fluidically connected to the first openings of at least one first molding device. Alternatively, a secondary stream of gas or gas mixture, which "entrains" the steam escaping, can be provided via a feed device. According to the quantity of the secondary stream thus introduced and its water saturation, sufficient steam can thus always be discharged in the case of an alignment of the thermodynamic conditions in the cavities, without a collapse of the ambient parameters required for the hot pressing occurring. Such a collapse could be, for example, a sharp drop in the temperature in the cavities and/or a dramatic change in pressure in the cavities. The method thus makes an optimization of the production time or takt time/cycle time possible for the hot pressing of preforms from a relatively moist pulp, wherein an alignment of the boiling temperatures in individual cavities in the case of a pressure equalization in first channels to the cavities with at the same time improved discharging of steam is achieved, as described above with reference to the tool components of a hot-pressing tool for a hot-pressing device.

In the method, a temperature control of the second tool component and the at least one second molding device can additionally also be effected, wherein a uniform heating or a heating different from this can be effected over the first contact surfaces and second contact surfaces of the cavities.

In further embodiments, the method is also used to regulate the hot-pressing operation, wherein the takt time/cycle time, the pressure which is generated via a corresponding press during the pressing of the first tool component and the second tool component, and the quantity of fluid discharged, for example by regulating the suction power, and optionally the location of valves in the case of channels for sucking in gas or a gas mixture (for example ambient air), and the closing speed, i.e. the speed at which the first tool component and the second tool component are moved towards each other relative to each other, are regulated via a control system. For this, the control system is connected to devices which can alter or influence the above settings and parameters.

The temperatures in the tool components can be detected and determined by sensor elements, which can be arranged as described above, wherein the closing speed, the takt time, the extraction power and/or the location of valves can then be regulated via the control system according to these temperatures.

In further embodiments, the gas or gas mixture can be provided from the surroundings of the at least one tool component or by a feed device, wherein the temperature and/or the pressure of the gas or gas mixture supplied via the at least one second opening at least in the at least one cavity are set by the feed device.

The feed device can for example have a compressor, which introduces ambient air, a gas (e.g. oxygen) or another gas mixture at a pressure higher than ambient pressure. It can occur that the negative pressure at which steam is extracted by suction from the cavities via an extraction device does not remain at the level provided via the extraction device. It is important that at least the suction effect for discharging steam in a defined direction is maintained or possibly supported by the positive pressure of the provided secondary stream of gas or gas mixture ("blowing out" of the steam in the direction of the extraction device).

In further embodiments, the evaporating residual moisture can be sucked in via the at least one first connection at an absolute pressure of from 0.1 to 0.7 bar, and/or the gas or gas mixture can be supplied via the at least one second opening at an absolute pressure of from 0.5 to 5 bar, preferably in the range of from 1 to 1.5 bar.

The above embodiments for the tool components and the hot-pressing device also apply in a corresponding manner to the different methods.

Further features, designs and advantages are revealed by the following description of embodiment examples with reference to the figures.

DETAILED DESCRIPTION

Embodiment examples of the technical teaching described herein are described below with reference to the figures. Identical reference numbers are used for identical components, parts and sequences in the description of the figures. Components, parts and sequences that are irrelevant for the technical teaching disclosed herein or are revealed to a person skilled in the art are not explicitly reproduced. Features specified in the singular are also included in the plural, unless explicitly stated otherwise. This relates in particular to specifications such as "a" or "an".

The figures show embodiment examples of tool components 640, 690, hot-pressing devices 610 as well as associated molding stations 600, fiber molding facilities 1000 and methods 2000 for operating fiber molding facilities 1000, in particular for the hot pressing of fiber preforms. Here, the embodiment examples shown do not represent a limitation with respect to further developments and modifications of the embodiments described.

Figure 1:
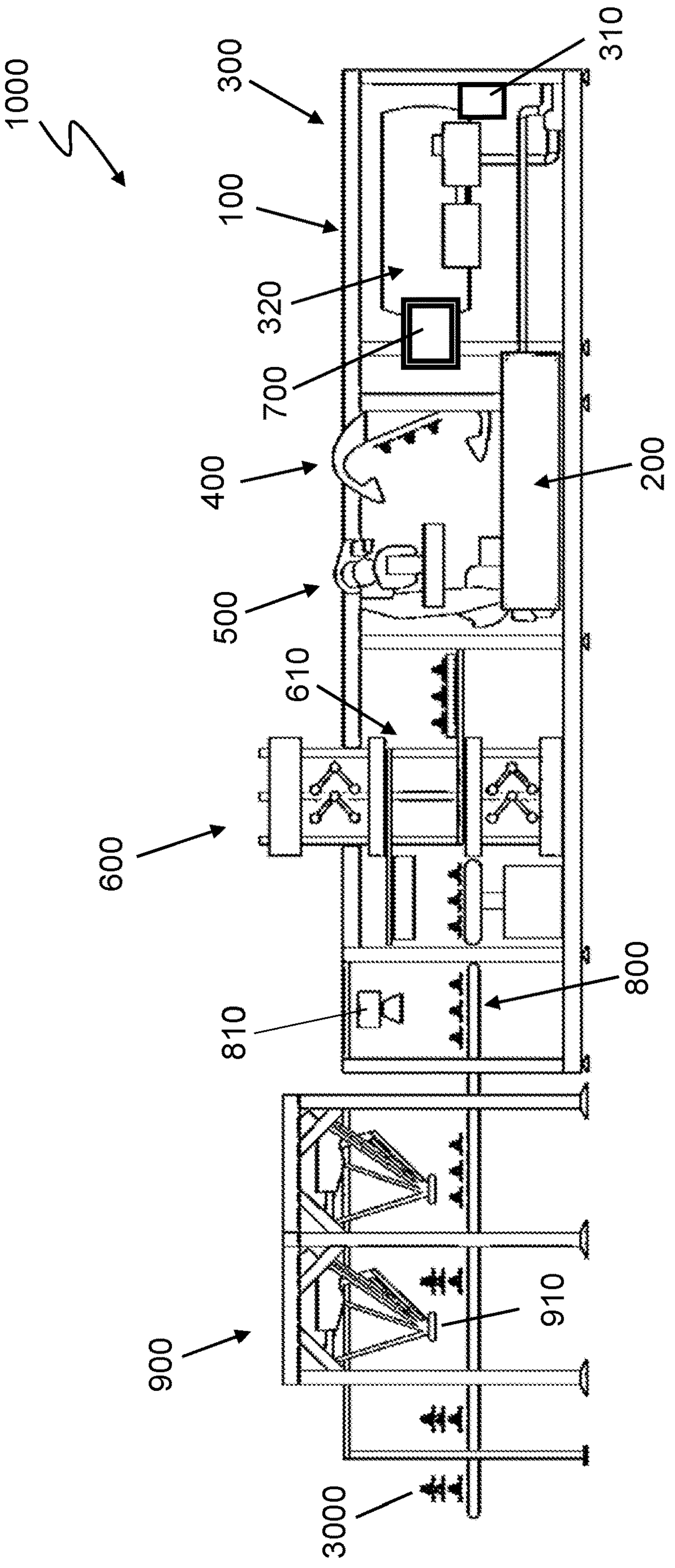
FIG. 1 depicts a schematic representation of a fiber molding facility for the production of products from a fibrous material.

FIG. 1 shows a schematic representation of a fiber molding facility 1000 for the production of products from a fibrous material. In the embodiment example shown, the fibrous material for the production of products is prepared by a fiber preparation facility and provided to the fiber molding facility 1000. The preparation and provision can for example be effected via supply lines, in which liquid pulp from a fiber preparation facility is supplied to a storage tank or a pulp tank 200 of the fiber molding facility 1000, for example continuously or discontinuously. Alternatively, pulp can be prepared in a pulp tank 200 of the fiber molding facility 200. For this, water and fibrous materials and optionally additives can, for example, be introduced into a pulp tank 200 via a liquid supply and the pulp in the pulp tank 200 can be prepared by mixing the individual components with heat input and by aids, such as for example a stirrer.

An aqueous solution which contains fibers is referred to as pulp, wherein the fiber content in the aqueous solution can be in a range of from 0.5 to 10 wt.-%. Additives, such as for example starch, chemical additives, wax, etc. can additionally be contained. The fibers can be, for example, natural fibers, such as cellulose fibers, or fibers from a fiber-containing original material (e.g. waste paper).

A fiber preparation facility offers the possibility of preparing pulp in large quantity and providing several fiber molding facilities 1000.

Biodegradable cups, capsules, bowls 3000 (FIGS. 7*a, b*), plates and further molded and/or packaging parts (for example as holder/support structures for electronic devices) can for example be produced via the fiber molding facility 1000. Since a fiber-containing pulp with natural fibers is used as raw material for the products, the products thus produced can, after they themselves have been used, be used again as raw material for the production of such products or composted, because they can generally be completely decomposed and do not contain any harmful, environmentally hazardous substances.

The fiber molding facility 1000 shown in FIG. 1 has a frame 100, which can be surrounded by a casing. A casing can have transparent side walls, via which stations and units of the fiber molding facility 1000 are visible and the product production process can be visually monitored. A casing is used for protection against moving and sometimes strongly heated parts of the fiber molding facility 1000 and against fibrous material from the pulp and the pulp itself, which can "splash about" during the production process. An access to supply units 300 of the fiber molding facility 1000 can be provided via a door. On the long side represented in FIG. 1, a casing can have slidable or rotatable doors, with the result that all stations of the fiber molding facility 1000 can be maintained.

The supply units 300 of the fiber molding facility 1000 comprise, for example, interfaces for the supply of media (for example water, pulp, compressed air, gas, etc.) and energy (power supply), a central control unit 310, at least one extraction device 320, pipelines for the various media, pumps, valves, lines, sensors, measuring devices, a bus system, etc. as well as interfaces for a bidirectional communication over a wired and/or wireless data connection. Instead of a wired data connection, there can also be a data connection via a fiber optic cable. The data connection can for example be between the control unit 310 and a central control system for several fiber molding facilities 1000, to a fiber preparation facility, to a service location and/or further devices. A control of the fiber molding facility 1000 can also be effected over a bidirectional data connection via a mobile device, such as for example a smartphone, tablet computer or the like.

The control unit 310 is in bidirectional communication with an HMI panel 700 via a bus system or over a data connection. The HMI panel 700 has a display which displays operating data and states of the fiber molding facility 1000 for selectable component parts or the entire fiber molding facility 1000. The display can be formed as a touch display, with the result that settings can hereby be made by hand by an operator of the fiber molding facility 1000. Further input means, such as for example a keyboard, a joystick, a keypad, etc., for operator inputs can additionally or alternatively be provided on the HMI panel 700. Via these, settings can be altered and the operation of the fiber molding facility 1000 can be influenced.

The fiber molding facility 1000 has a robot 500. The robot 500 is formed as a so-called 6-axis robot and is thus capable of picking up parts within its radius of action, rotating and moving in all spatial directions. Instead of the robot 500 shown in the figures, other handling devices can also be provided, which are formed to pick up products and twist or rotate and move in the different spatial directions. In addition, such a handling device can also be formed otherwise, wherein for this the arrangement of the corresponding stations of the fiber molding facility 1000 can differ from the embodiment example shown.

A suction tool is arranged on the robot 500. In the embodiment example shown, the suction tool has preforming molds formed as negative of the products to be molded, such as for example bowls 3000 shown in FIGS. 7*a, b*. These preforming molds can for example have a mesh-like structure, on which fibers from the pulp accumulate. The preforming molds further have openings via which pulp can be sucked in by means of a vacuum when the suction tool is located inside the pulp tank 200 such that the preforming molds are at least partially located in the aqueous fiber solution, the pulp. A vacuum or a negative pressure for sucking in fibers when the suction tool is located in the pulp tank 200 and the pulp can be provided via the extraction device 320. For this, the fiber molding facility 1000 has corresponding means in the supply units 300. The suction tool has lines for the provision of the vacuum/negative pressure by the extraction device 320 in the supply units 300 to the suction tool and the openings in the preforming molds. Valves which can be actuated via the control unit 310 and thus regulate the sucking-in of the fibers are arranged in the lines. Instead of a sucking in, a "blowing out" can also be effected by the extraction device 320, for which the extraction device 320 is switched into another operating mode according to its design.

During the production of products from a fibrous material, the suction tool is dipped into the pulp and a negative pressure/vacuum is applied to the openings of the preforming molds, with the result that fibers from the pulp are sucked in and accumulate on the preforming molds of the suction tool. Then the robot 500 moves the suction tool to a pre-pressing station 400 of the fiber molding facility 1000, together with the fibers, adhering to the preforming molds, which still have a relatively high moisture content of, for example, above 80 wt.-% water. The negative pressure on the preforming molds is maintained. The pre-pressing station 400 has a pre-pressing tool with pre-pressing molds. The pre-pressing molds can for example be formed as positive of the products to be molded and have a corresponding size with respect to the shape of the products to receive the fibers adhering to the preforming molds.

During the production of products, the suction tool, with the fibers adhering to the preforming molds, is moved to the pre-pressing station 400 such that the fibers are pushed into the pre-pressing molds. The fibers on the preforming molds are pressed together, with the result that a stronger connection between the fibers is hereby produced. Moreover, the moisture content of the preforms thereby formed is reduced, with the result that the preforms formed after the pre-pressing only have a moisture content of, for example, 60 wt.-%.

During the pre-pressing, liquid or pulp can be extracted by suction and returned via the suction tool and/or via further openings in the pre-pressing molds. The liquid or pulp escaping during the sucking in via the suction tool and/or during the pre-pressing in the pre-pressing station 400 can be returned to the pulp tank 200.

After the pre-pressing in the pre-pressing station 400 the thus-produced preforms are moved on the suction tool via the robot 500 to a molding station 600. For this, the negative pressure on the suction tool is maintained so that the preforms remain on or in the preforming molds. The preforms are transferred via the suction tool to a first, lower tool body 642, which can be moved along the manufacturing line out of the hot-pressing device 610. If the tool body 642 is in its extended position, the suction tool is moved to the tool body 642 such that the preforms can be placed on first molding devices 670 of the tool body 642. Then a positive pressure is generated via the openings in the suction tool, with the result that the preforms are actively deposited by the preforming molds, or the suction is stopped, with the result that the preforms remain, due to gravity, on the first molding devices 670 of the first tool body 642. By providing positive pressure at the openings of the preforming molds, pre-pressed preforms, which are in contact with/adhering to the preforming molds, can be detached and released.

The suction tool is then moved away via the robot 500 and the suction tool is dipped into the pulp tank 200 in order to suck in further fibers for the production of fiber-containing products.

In the molding station 600, a pressing is then effected with heat input. After this hot-pressing operation, the first tool body 642 and the second tool body 692 are moved away from each other and the upper, second tool body 692 is moved along the fiber molding facility 1000 in the manufacturing direction, wherein, after the hot pressing, the manufactured products are sucked in via the upper, second tool body 692 and thus remain within the second molding devices 694. The manufactured products are thus taken out of the molding station 600 and, after the method, deposited on a conveyor belt of a conveying device 800 via the second tool body 692. After the depositing, the suction via the second tool body 692 is stopped and the products remain on the conveyor belt. The second, upper tool body 692 moves back into the molding station 600 and a further hot-pressing operation can be carried out.

The molding station 600 has a hot-pressing device 610. The pressing of the preforms to give finished products made of fiber-containing material is affected in the hot-pressing device 610 under the action of heat. A possible design of the molding station 600 is shown schematically in FIG. 2.

The fiber molding facility 1000 furthermore has a conveying device 800 with a conveyor belt. The manufactured products made of fiber-containing material can, after the final molding and the hot pressing in the molding station 600, be deposited on the conveyor belt and extracted from the fiber molding facility 1000. In further embodiments, after the products have been deposited on the conveyor belt of the conveying device 800, a further processing can be effected, such as for example a printing, a filling and/or a stacking of the products. The stacking can for example be effected via an additional robot or another device. Such a device can for example have at least one gripper 910, which grips the products deposited on the conveyor belt and stacks them in a crate or similar. The at least one gripper 910 can cooperate with an optical device, such as for example a camera, for capturing the position and orientation of products, wherein the images captured using the camera are analyzed via a piece of software, which then outputs control commands for the at least one gripper on the basis of the analyzed images.

Moreover, the fiber molding facility 1000 has a stacking device 900 downstream of the molding station 600 in the manufacturing direction. In the embodiment example shown, the stacking device 900 has two gripper devices arranged one behind the other, in each case with a gripper 910. After the hot pressing, individual bowls 3000 can be gripped and for example stacked via the grippers 910, as shown schematically in FIG. 1. A camera 810, which captures the position and orientation of the bowls 3000 arranged on a conveyor belt of a conveying device 800, is arranged in front of the stacking device 900. The captured images are analyzed by the control system, which generates control commands from them for the grippers 910 to pick up the bowls 3000.

In further embodiments, a fiber molding facility 1000 can have a crane for changing a first tool body 642 and a second tool body 692 for a retooling of the fiber molding facility 1000 for other products or for the maintenance of the tool body 642 and/or the tool body 992.

Figure 2:
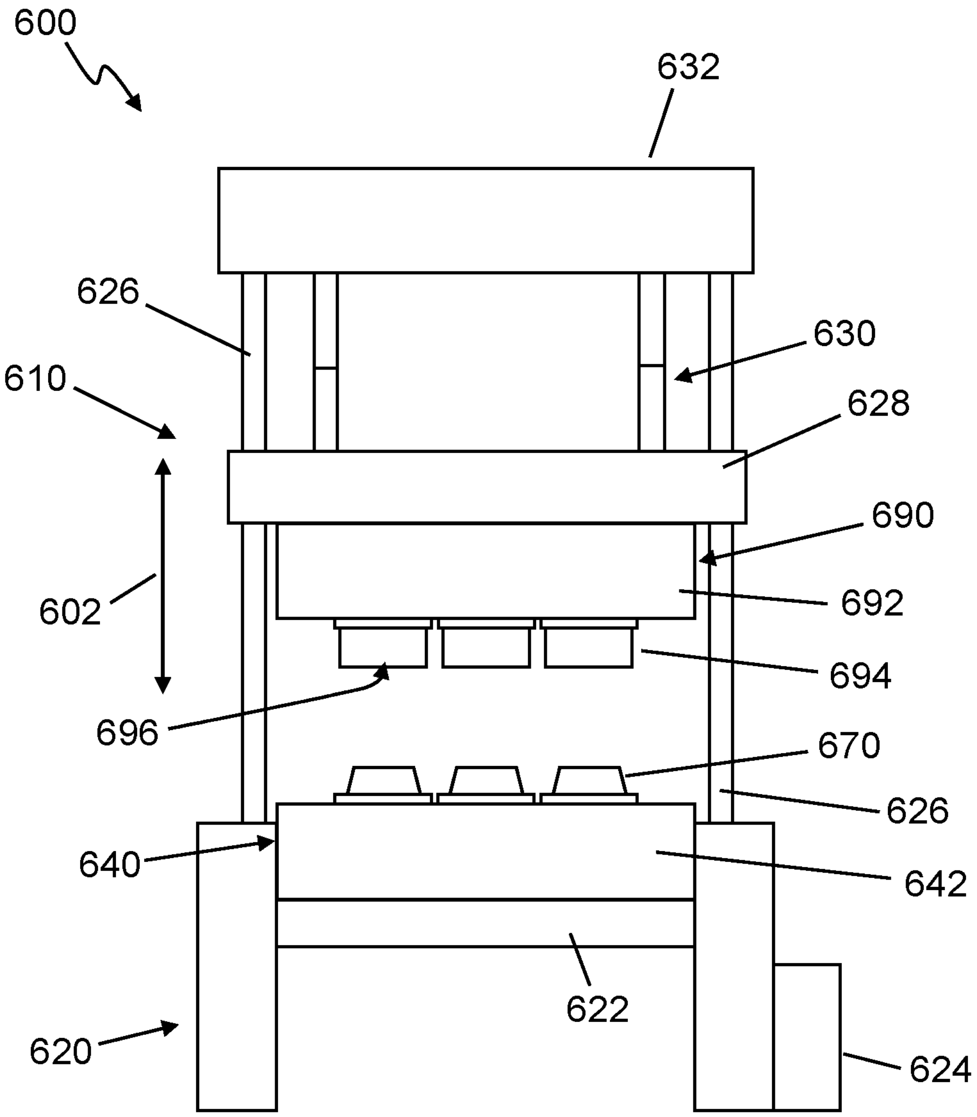
FIG. 2 depicts a schematic representation of a molding station with a hot-pressing device for the hot pressing of preforms for the production of products from a fibrous material with a hot-pressing tool.

FIG. 2 shows a schematic representation of the molding station 600 with a hot-pressing device 610 for the hot pressing of preforms for the production of products from a fibrous material with a hot-pressing tool.

FIG. 2 shows the molding station 600 in an open state. The molding station 600 with the hot-pressing device 610 has a base frame 620 with a tool table 622. A first tool component 640 is arranged on the tool table 622. The first tool component 640 has the first, lower tool body 642, which is arranged linearly displaceable on the tool table 622. The first tool body 642 is movable relative to the tool table 622 in the drawing direction. A rail system or another device for the linear displacement of the first tool body 642 is provided for this. A drive is additionally provided, which implements the linear displacement of the first tool body 642. The drive is regulated by the control unit 310 according to control signals. Several molding devices 670, which are formed as negative of the products to be molded, are arranged on the top of the first tool body 642. The design of the molding devices is explained in more detail below with reference to FIGS. 3 and 4.

The molding station 600 has a second tool component 690 with the second tool body 692. The second, upper tool body 692 has, on its underside, second molding devices 696 which are formed as positive of the products to be molded. When the first tool component 640 and the second tool component 690 are displaced towards each other and pressed, a cavity, the dimensions and shape of which correspond to those of the products to be manufactured, is in each case produced between the contact surfaces 676, 696 of the first molding devices 670 and the second molding devices 694.

The upper tool body 692 is arranged linearly displaceable on an upper tool table 628, wherein the upper tool body 692 can hereby be displaced in the opposite direction to the first tool body 642 via a rail system or similar and an associated drive when a hot-pressing operation has been stopped, in order to deposit the manufactured products on the conveyor belt of the conveying device 800. The drive is actuated via the control unit 310.

Via guide rods 626, the upper tool table 628 is displaceable in the movement direction 602 over a press, which can be formed, for example, as a knuckle joint press 630. Instead of the knuckle joint press 630, in a further embodiment the press can be realized by a linearly movable pressing device, which is likewise denoted by the reference number “630”. A pressing device can for example be pneumatically, hydraulically and/or electrically driven via corresponding devices and can implement the relative displacement of first tool component 640 and second tool component 690. The knuckle joint press 630 is arranged on a yoke 632 of the molding station 600. According to the control unit 310, the second tool component 690 is moved downwards to the first tool component 640 via the knuckle joint press 630, wherein the second tool body 692 with the second molding devices 694 is guided via the upper tool table 628 and the guide rods 626.

In the embodiment example shown, an interface 624 is used for the provision of control commands, for the supply of energy, for the provision of media (e.g., compressed air, etc.) and for the removal of media (e.g. sucked-in fluid, air, water, etc.).

The first tool body 642 and the first molding devices 670 as well as the second tool body 692 with the second molding devices 694 include, in particular, of a material having very good thermal conductivity properties. Metals are preferably used for this. In the embodiments shown, the first tool body 642 and the first molding devices 670 as well as the second tool body 692 and the second molding devices 694 include aluminum.

Temperature control means (e.g., temperature control devices), which provide a heating of the tool bodies 642 and 692 and of the molding devices 670, 694, are received in the first tool body 642 and in the second tool body 692. The temperature control means are actuated according to control signals of the control unit 310. For example, the temperature control means are heating cartridges 660. Heating cartridges 660 generate heat by application of an electric voltage. Thus, the heating of the tool components 640, 690 can hereby be easily regulated. In further embodiments, other temperature control means can also be used.

Figure 3:
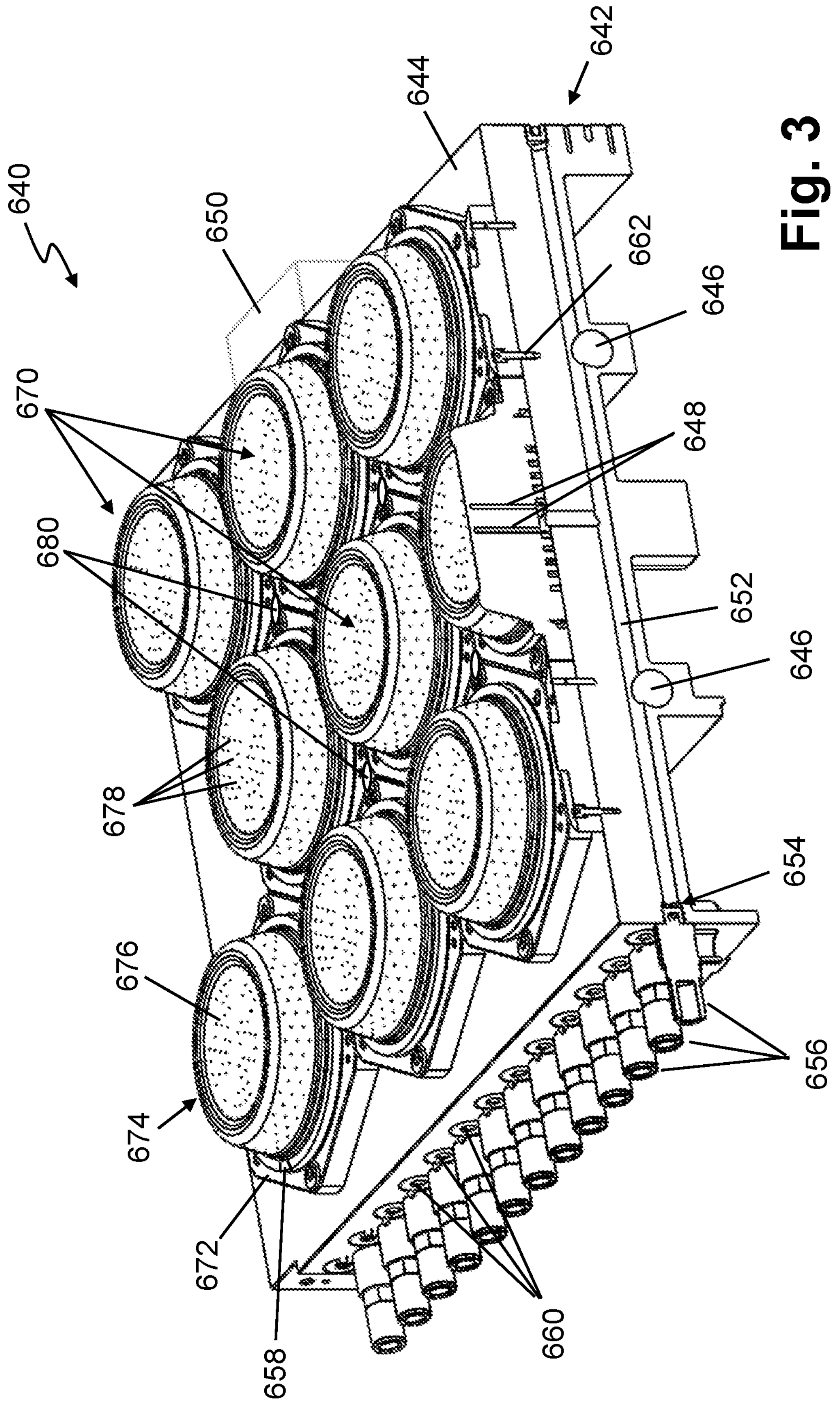
FIG. 3 depicts a schematic representation of a tool component of a hot-pressing tool in perspective view.

FIG. 3 shows a schematic, partially cut representation of a tool component 640 of a hot-pressing tool in perspective view. The first tool component 640 has, on its top, a board 644 on which molding devices 670 for hot pressing bowls 3000 can be connected to the first tool body 642 via fastening means, such as for example screws 662 and allocated openings in the board 644. The first molding devices 670 have a base 672 with corresponding openings for the fastening to the first tool body 642, wherein the bases 672 are not used for the shaping of the bowls 3000. This makes it possible to replace first molding devices 670, for example in order to retool the fiber molding facility 1000 for other products or to replace contaminated, or damaged, first molding devices 670 for maintenance.

On the underside, the first tool body 642 is formed corresponding to the rail system for displacing the first tool body 642. For this, a toothed rack is further arranged on the first tool body 642, which is engaged with a driven toothed wheel of a drive provided on the tool table 622. By rotating the toothed wheel via the drive an advance of the first tool body 642 for the displacement thereof can thus be affected.

In the embodiment example shown, two first channels 646 extend inwards substantially in the drawing direction in the first tool body 642. The first channels 646 are fluidically connected to a device for extraction by suction, for example the extraction device 320, via a connecting unit 650, with the result that a vacuum can be generated in the first channels 646 via a corresponding first connection and the connecting unit 650. The first channels 646 in the first tool body 642 are also connected to second channels 652, wherein the second channels 652 run transverse to the first channels 646 and are oriented parallel to each other.

The second channels 652 have second connections 654, which are fitted with valves 656. In this embodiment, the second connections 654 form second openings, via which the supply of ambient air, or in further embodiments the supply of a gas (e.g. oxygen) or another gas mixture, is effected. In still further embodiments, the quantity and the pressure of the supplied gas or gas mixture can be regulated via a compressor. Such a compressor can for example be arranged in the supply units 300 and fluidically connected to at least one second opening via the interface 624, in order to provide a "secondary stream" of gas or of a gas mixture during the hot pressing.

In further embodiments, second openings are arranged in further surfaces of the first tool body 642. For example, one or more second openings can be arranged in the surface of the board 644, in an underside lying opposite the board 644 or in further side walls, orthogonal to the side wall with the valves 656 shown in FIG. 3 or lying opposite. For example, in the case of second openings arranged in the surface of the board 644, it can be achieved that relatively short second channels are provided, with the result that slight cooling of the tool body 642 and thus of molding devices 670 occurs. Second openings arranged in the surface of the board 644 can in particular be provided between first molding devices 670, because the strongest heating of the tool body 642 can occur there locally during operation of the hot-pressing device. A heating of the secondary stream of gas or gas mixture supplied via the second openings can thus be achieved without the energy withdrawn from the tool body 642 for it locally resulting in the temperature falling below a target temperature of the tool body 642 for the heating of the molding devices 670.

In still further embodiments, the supply units 300 contain heating devices for heating the secondary stream of gas or gas mixture, with the result that a secondary stream with a defined temperature can be introduced via the second openings. As the water saturation of the secondary stream is crucial for the ability to discharge steam, the supply units 300 in further embodiments can also have devices for dehumidifying the secondary stream of gas or gas mixture, before the secondary stream is supplied via at least one second opening. Dehumidifying devices can in particular be required and substantially support the hot-pressing process when, for example, ambient air is used for the secondary air stream, and the ambient air already has a relatively high water saturation or humidity.

In further embodiments, the stream of steam/gas extracted by suction or otherwise discharged, which has a relatively high temperature (>90° C.), can be guided over a heat exchanger, which transfers the heat to a secondary stream sucked in or otherwise provided, which is supplied via the second openings or valves 656. The energy of the stream discharged from the cavities is thus utilized in order to heat up the secondary stream. This prevents or reduces a cooling of the tool components 640, 690 via the secondary stream. Furthermore, warmer air, for example, has a higher capacity to absorb steam, because the saturation is lower. The discharge of steam is thus further improved.

The second channels 652 are fluidically connected to the environment via the valves 656, with the result that, for example, a gas mixture (e.g., ambient air) or a gas can hereby be sucked in. The valves 656 can be actuated via the control unit 310 and can thus regulate what quantity of gas mixture or gas can be sucked in. The second channels 652 are closed at the ends lying opposite the valves 656. In further embodiments, second channels 652 do not have valves 656, with the result that, constantly, a connection to the environment or a device for the provision of gas or gas mixture via corresponding second openings is produced and a gas mixture or a gas is also sucked in when a vacuum or negative pressure is provided in the first channels 646.

Perpendicular channel sections 653 extend from the second channels 652 through the board 644 and lie opposite corresponding openings in the base 672 on the undersides of the first molding devices 670. The first molding devices 670 have molding channels 648, which open into numerous openings 678 in the surfaces of the molds 674 formed via the first molding devices 670. The surfaces of the molds 674 form first contact surfaces 676 for preforms made of fiber-containing material to be received.

The molds 674 shown are used for the production of bowls 3000 as finished products from the preforms. For this, the molds 674 have a flat surface, which is used for the formation of the bottom 3010 of a bowl 3000. A circumferential side wall 3020, which is formed by the inclined lateral surfaces of the molds 674, extends from the bottom 3010. In the embodiment example shown, a finished bowl 3000 (FIG. 7*a*) has a substantially circular bottom surface and a circumferential, steep lateral surface, the upper end of which facing away from the bottom 3010 has a rim 3030 which is formed on the lower ring of the molds 674 which extends around the inclined lateral surfaces.

Heating cartridges 660, which are supplied with power via the connecting unit 650 and can be actuated via the control unit 310, extend through the first tool body 642 parallel to the second channels 652. In the embodiment example shown, the first tool body 642 is heated to, for example, 250° C. via the heating cartridges 660. In further embodiments, the first tool body 642 can for example be heated in a temperature range of between 150° C. and 300° C. A heating of the second tool body 692 can also be effected via heating cartridges 660 or other temperature control means, wherein the same temperature range as for the first tool body 642 can in particular be used. In the embodiment example shown, the first tool body 642 and the second tool body 692 can for example be brought substantially to the same temperature level.

First temperature sensors 680, which are arranged in the region of connection points between the bases 672 of individual first molding devices 670, are shown in FIG. 3. The first temperature sensors 680 can be provided and operated for the determination of the temperature behavior during the hot pressing, only for a particular period or permanently during operation, during a production of products. The first temperature sensors 680 are connected to the control unit 310 via associated wires. In further embodiments, there can also be a wireless bidirectional communication path between temperature sensors 680, 681, 682 and the control unit 310. For the operation of the temperature sensors, the required energy can for example be provided via energy storage means, which are then connected to the respective temperature sensors. The control unit 310 can thus regulate the heating of the first tool component 640 and the second tool component 690 as well as the cycle time for the hot pressing, in particular the duration and the closing speed of the molding device 600, on the basis of the detected temperature values.

A further embodiment with a second opening formed as a recess 658 is shown in FIG. 3. The recess 658 is located in a contact region of a molding device 670 for a corresponding contact region of a second molding device 694. In the closed state of the hot-pressing device 610, the first molding device 670 and the second molding device 694 are in contact with opposite surfaces of the contact regions. In the region of the recess 658, a small second opening is then formed, via which a fluidic connection to the first openings 678 is provided separate from the first connection. Ambient air can for example also be sucked in via such a recess 658 during the hot pressing. Furthermore, it is also possible hereby to introduce another gas mixture or a gas into the cavity. In further embodiments, the correspondingly formed second molding device 694 can also have a recess 658 or no recess 658. In further embodiments, several recesses 658 can be provided distributed around the cavity.

Figure 4:
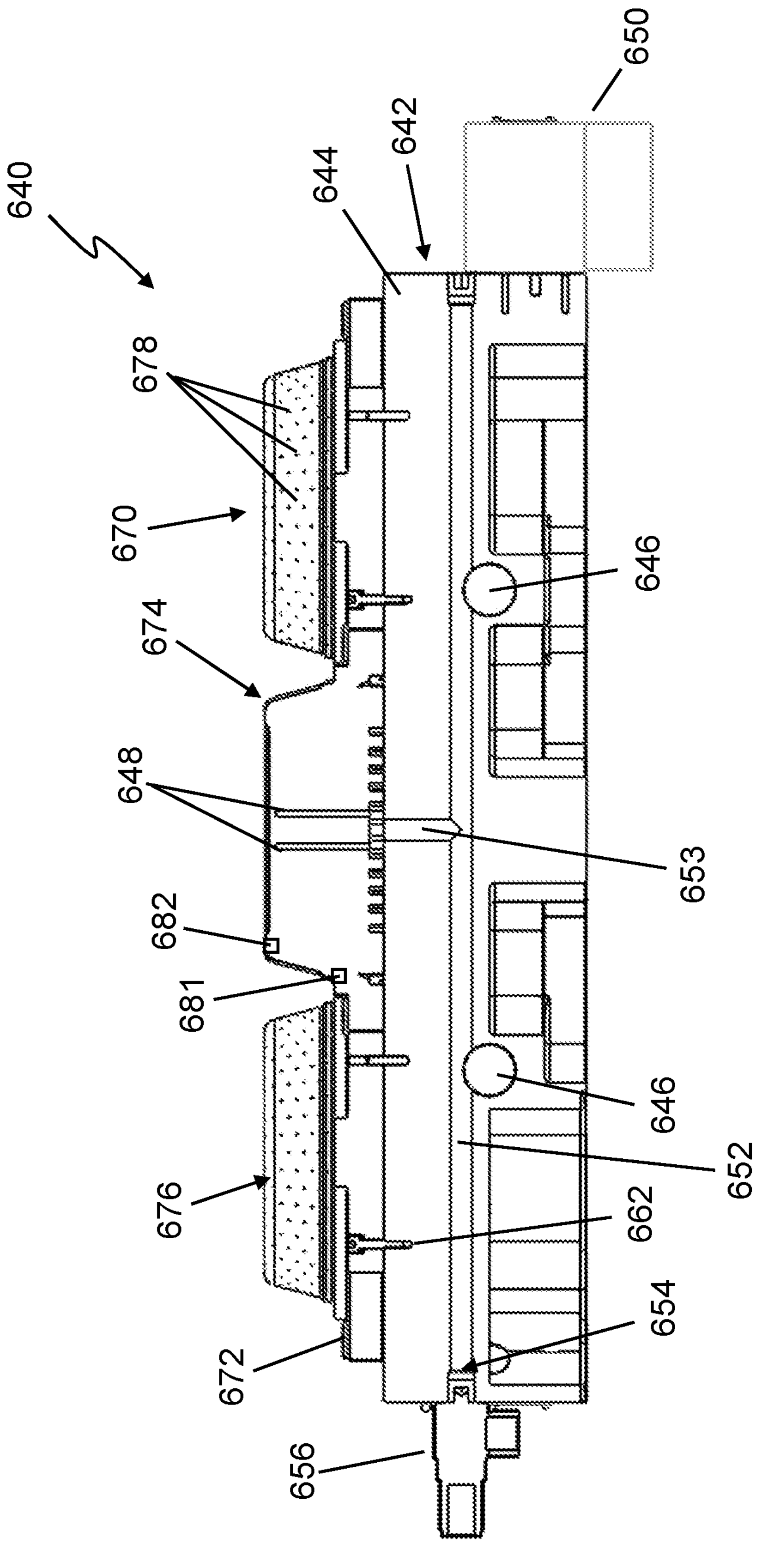
FIG. 4 depicts a first schematic sectional view of the tool component of FIG. 3.

FIG. 4 shows a first schematic sectional view of the first tool component 640 of FIG. 3. The connection between the first channels 646, the second channels 652 and the molding channels 648 via a perpendicular channel section 653 can be seen from FIG. 4. In the base 672 the molding devices 670 have, on their underside, an opening, which lies opposite the channel sections 653, with the result that, through the provision of a negative pressure in the first channels 646, preforms which have been placed on the contact surfaces 676 are automatically sucked in. Moreover, moisture escaping from the preforms during the hot pressing is sucked in via the first openings 678 in the first contact surfaces 676 and discharged via the channels in the first tool body 642. Thus, the moisture content of the preforms can be reduced and the moisture being released can be discharged.

Further temperature sensors for the middle molding device 670 are shown in FIG. 4. The temperature sensors can be provided in the case of all molding devices 670. In addition, several such sensors can be arranged in the corresponding locations on the circumference.

Thus, the molding device 670 has, for example, a second temperature sensor 681 in the edge region of the product to be manufactured. The molding device 670 additionally has a third temperature sensor 682 in a bottom region of the product to be manufactured.

The temperature sensors 681, 682 can for example be arranged directly on the surface of the contact surfaces 676. In further embodiments, the temperature sensors 681, 682 can be arranged underneath the surface of the contact surfaces 676. For example, the temperature sensors 681, 682 are located at a distance of from 0.5 to 5 mm underneath the surfaces, with the result that the temperature sensors 681, 682 on the one hand do not influence the shaping and the hot-pressing operation through their presence and on the other hand nevertheless make a relatively accurate detection of the temperature possible.

In further embodiments, a measuring tip of a temperature sensor 681, 682 can be received in an opening in the contact surfaces 676, wherein such an opening from the shape and the diameter substantially corresponds to the first openings 678. In such embodiments it is important that moisture is not sucked in via this opening with the measuring tip inserted therein and there is also no fluidic connection to the first openings 678 for the extraction by suction, so that the measuring tip or the respective temperature sensor is not cooled by the stream of steam extracted by suction and the secondary stream of gas or gas mixture also sucked in.

In further embodiments, wherein the temperature sensors 681, 682 are not arranged directly on the surface of the contact surfaces 676, a measurement of the temperatures underneath the surface of the contact surfaces 676 is effected by the temperature sensors 680, 681, 682 and a measurement of the surface temperature of the contact surfaces 676 is effected by further, non-stationary measuring devices before the temperature sensors 680, 681, 682 are used in normal operation. The difference is then ascertained, wherein the cooling power etc. provided by moist preforms is taken into consideration for the determination of the temperature prevailing on the surface. The temperatures detected underneath the surface of the contact surfaces 676 by the temperature sensors 680, 681, 682 are then stored as reference values for the temperatures actually prevailing on the surfaces in a memory which the control unit 310 accesses during operation of the fiber molding facility 1000 for the control and regulation of its units and stations. Because reference values for surface temperatures are detected, the operation of the molding station 600 can thus be effected without temperature sensors having to be arranged directly on the surface of the contact surfaces 676 etc. Much simpler temperature sensors can hereby be used and the effort to install the temperature sensors 680, 681, 682 is reduced compared with temperature sensors 680, 681, 682 arranged directly on the surface. For example, temperature sensors 680, 681, 682 can be inserted into drilled holes in the first molding devices 670. These drilled holes can be sealed using a (high-)temperature-resistant material having poor thermal conductivity properties after the temperature sensors 680, 681, 682 have been inserted.

In embodiments with temperature sensors 680, 681, 682 arranged directly on the surface of the first tool component 640, the first molding devices 670 can additionally have a (high) temperature-resistant coating which extends at least over the entire contact surface area (first contact surfaces 676) of at least the first molding devices 670.

Figure 5:
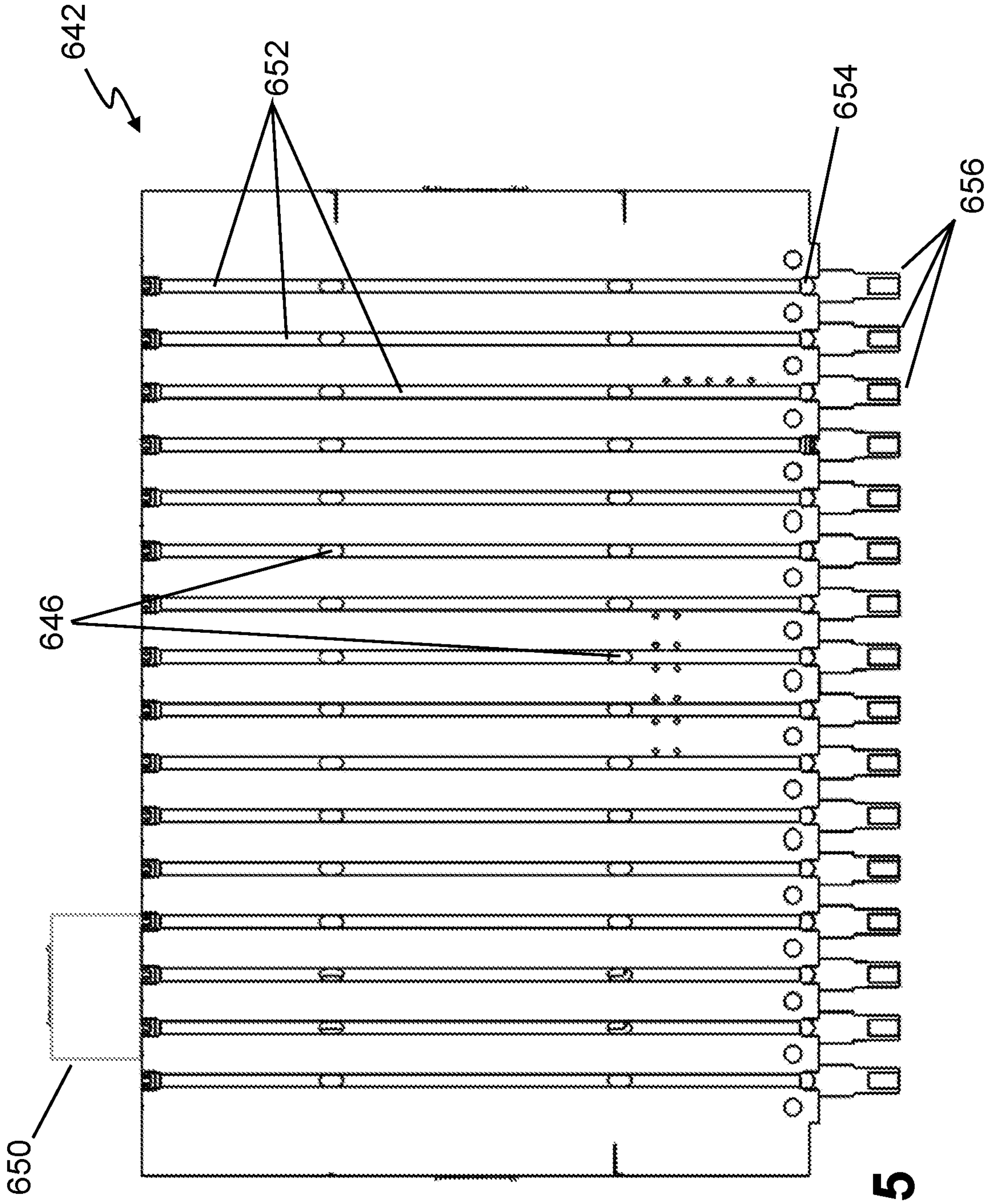
FIG. 5 depicts a second schematic sectional view of the tool component of FIG. 3.

FIG. 5 shows a second schematic sectional view of the first tool component 640 of FIG. 3, wherein the section plane runs through the second channels 652. The representation shows that, in this embodiment, the second channels 652 run parallel to each other and orthogonal to the first channels 646. In this embodiment, the second channels 652 in each case have two regions of connection to the first channels 646. In further embodiments, the number of first channels 646 and the connection regions can be greater than two. In still further embodiments, only one first channel 646, and thus one connection region, can also be provided per second channel 652. In further embodiments, one or more first channels 646 and one or more second channels 652 can run not orthogonal, but in other orientations relative to each other. In still further embodiments, first channels 646 and second channels 652 can be “interwoven” with each other, wherein the channels 646 and 652 are located alternating in planes running with respect to each other parallel to the board 644.

The formation, in particular the number and orientation of the channels 646, 652, is effected according to the volume of steam which has to be discharged in a definable unit of time during a hot-pressing operation. For this, the layout of the tool components 640, 690 is effected according to a maximum occupancy of the surface area of the board 644 available for molding devices. For example, individual channels of the first molding devices 670 can have a smaller diameter than a common channel section just before the connecting unit 650, because the volume of steam discharged per unit of time is larger than in the individual channels of the first molding devices 670. At least one common channel here can have a diameter increasing in size continuously or in sections. In addition, in further embodiments, channels can have corresponding radii and curves which make an aerodynamically efficient discharge of steam possible.

In the embodiment of a tool body 642 shown in FIGS. 3 to 5, the first channels 646 have larger diameters than the second channels 652, wherein in particular the diameters of the second channels 652 are according to the cross sections necessary for preventing temporary blockages in the first channels 646 in the case of a large steam volume occurring locally. The diameters of the channels 646, 652 have a maximum size, so that the tool body 642 is not cooled by gas mixture or gas sucked in, the temperatures of which (in particular when ambient air is also sucked in) are in principle lower than the temperature of the steam sucked in and the tool body 642.

In the embodiment example shown, the second tool component 690 also has heating cartridges for controlling the temperature of the second tool body 692 and the second molding devices 694 connected to it. The second tool body 692 also has suction means, wherein hereby, in various embodiments, either steam escaping is not sucked in during the hot pressing of the preforms or steam escaping is sucked in analogously to the embodiments and methods described for the first tool component 640 (ambient air is additionally sucked in). In a further embodiment, the sucking in via the second tool body 692 and corresponding openings in the second molding devices 694 can generally be effected after the hot pressing, in order to hold the finished products in the second molding devices 694 and to deposit them on the conveyor belt of the conveying device 800 after the second tool body 692 has been moved.

The structure of the second tool body 692 can generally differ only insignificantly from the structure of the first tool body 642. Thus, the second tool body 692 has corresponding means, in order to be connected to second molding devices 694 which are formed corresponding to the first molding devices 670, in order to form cavities between the first contact surfaces 676 of the first molding devices 670 and the second contact surfaces 696 of the second molding devices 694 in the pressed state. The cavities are closed in the pressed state of the first tool body 642 and the second tool body 692, with the result that no pulp or steam can escape except via the first openings 678 in the first contact surfaces 676. Steam is prevented from escaping via second openings because the flow direction for the steam is specified due to the suction via a first connection.

In further embodiments, the formation of the first molding devices 670 and the formation, complementary thereto, of the second molding devices 694 can also be effected conversely to the embodiment shown in the figures. Here, the suction tool with the preforming molds and the pre-pressing station 400 with the pre-pressing molds are then also to be correspondingly adapted. In the case of a retooling of the tools for other products, the suction tool, the pre-pressing tool and also the first and second molding devices 670, 694 therefore have to be replaced.

In further embodiments, first and second tool bodies 642 and 692 can have integrated molding devices 670 and 694, which are fixedly connected to the first tool body 642 or the second tool body 692, respectively, and formed as an integral component part, for example.

As already stated at the beginning, the hot-pressing process proves to be difficult in the case of the production of products from fiber-containing material, in particular in the case of a relatively high moisture content of the preforms to be hot pressed, because different temperature levels can occur in the cavities formed between the first contact surfaces 676 and the second contact surfaces 696. In addition, a “blocking” and further problems named at the beginning can also occur due to various pressure conditions.

The design, described herein, of the first tool body 642 with at least one additional second channel 652 or with at least one second opening via which a gas mixture or a gas is also sucked in when the forming steam is extracted by suction during the hot pressing offers a further possibility of removing the problems named at the beginning because the temperatures in the cavities are aligned and sufficient volume is available for discharging the forming steam, even in the case of briefly occurring, local peaks of forming steam.

Through a stepwise closing of the hot-pressing device 610 adapted to the respective moisture contents of the preforms, wherein the second tool component 690 is pushed against the first tool component 640 under force via the knuckle joint press 630 or another pressing device, in further embodiments as much excess water as effectively evaporate on the heated contact surfaces 676 of the first molding devices 670 and the contact surfaces 696 of the second molding devices 694 can escape from the preforms in a targeted manner. This process can be affected by monitoring the surface temperature on the contact surfaces 676 and/or 696 or reference values for the surface temperatures. The surface temperature on the contact surfaces 676 and 696 is thus prevented from dropping critically. For this, the closing movement and in particular the closing speed, i.e. the speed at which the second tool component 690 is moved to the first tool component 640, can be adapted stepwise. Instead of a knuckle joint press 630, a linear pressing device can therefore also be provided, which makes an exact, stepwise movement of the second tool component 690 possible. The closing and the closing speed are regulated by the control unit 310.

The hot-pressing process is effected according to the composition of the pulp and the moisture content of a preform which is formed by a filter cake made of fibrous material. The residual moisture after a pre-pressing operation is decisive for the hot-pressing operation described herein. In the case of upstream process steps with silicone pre-pressed bodies acted upon by, for example, compressed air, the residual moisture can be in the range of from 50-70 wt.-%. It is preferably attempted to keep the moisture content as low as possible through a pre-pressing operation. During the pre-pressing, moisture (water) is generally only squeezed out of the sucked-in preforms mechanically. Thus, no evaporation takes place.

The moisture stored in preforms is present on the one hand between the fibers and on the other hand as water bound in the fibers. The former can be squeezed out of the fiber mesh mechanically, whereas water bound in the fibers has to evaporate or vaporize.

In the case of a known composition of the pulp, defined residual moisture contents in the preforms can be achieved by predefining the suction time in the pulp tank, the pressure during the pre-pressing and the pre-pressing duration. A residual moisture content can also be ascertained for a determinable number of preforms with defined parameters. Preforms with a defined residual moisture are then transferred to or placed on a lower tool half, first tool component 640, for example. For the preforms, size differences of pre-pressing and hot-pressing tool components due to different thermal expansions are to be taken into consideration.

During the transfer and the transporting into the hot-pressing device 610, the preform is actively sucked in via the first openings 678 and held in position. The first tool component 640 and the second tool component 690 then close to a holding position just above the contact point of second molding devices 694 and preform. In order to avoid an erroneous adhesion to the contact surfaces 696, a short amount of time can be spent there or the closing speed can be decreased from this changeover position. During the linear closing operation, the closing force increases—caused by the infeed of the first tool component 640 and the second tool component 690 and the preform lying in between.

Water lying between fiber bundles is thereby squeezed out mechanically and evaporates on the hot surfaces of the contact surfaces 676, 696 of the cavity. Depending on the topology of the product and according to the residual moisture content after a pre-pressing, variable quantities of water form in the course of the closing.

As evaporating excess water withdraws thermal energy from the surface of the contact surfaces 676, 696 cyclically, a sharp drop in the surface temperature of the cavities therefore occurs, while excess water turns into steam from boiling temperature due to the energy input. The two tool components 640, 690 with the molding devices 670, 694 in the process form an almost enclosed space, in which the forming steam is discharged in a channeled manner via the openings 678 and the channels 646, 652 in the tool bodies 642, 692.

With the aid of a controlled aeration of the tool bodies 642, 692 instead of pure steam extraction by suction as well as, in further embodiments, in combination with a regulated closing speed for the controlled formation of steam, blocking does not occur, with the result that a hot-pressing process can proceed in an intrinsically more stable and balanced manner.

To reach the physical limits of the hot-pressing process, in order thereby to achieve the fastest possible cycle time, the maximum possible thermal energy yield must be ensured. A cycle runs optimally when the direct surface temperature of the contact surfaces 676, 696 of the cavities drops to the characteristic boiling temperature of the liquid contained in the preform. In the case of an aeration with ambient air, the boiling temperature is 100° C. at ambient pressure without a significant pressure increase in the components of the hot-pressing device 610. An adapted closing of the hot-pressing device 610 ensures that only as much water as can evaporate on the contact surfaces 676, 696 without the surface temperature falling below the boiling temperature of the extracted liquid is extracted from the preforms. Excess water is thus prevented from cooling the surface temperature to below boiling temperature, which would have the result that no steam forms until the energy stored in the molding devices 670, 694, or the tool bodies 642, 692, has an impact again and the water can thus evaporate again. In such cases, cycle time would be lost while the surface temperature has dropped to below boiling temperature. This can be prevented by regulating the closing movement according to the surface temperature of the contact surfaces 676, 696.

Furthermore, characteristic closing speeds can be defined, which are adapted both to the steam formation and to the optimum energy yield. The dimension of the relative closing speed dependent on the quantity of water can be [mm/(s ml)] and vary in the e-3 range (e.g. 2*10-3 [mm/s ml]). The max. possible absolute closing speed is dependent on the material and the topology of the preform, wherein large surfaces on which a lot of water escapes in a short time are travelled over more slowly, with respect to the absolute closing speed, than inclined surfaces. In the embodiment example of FIG. 7, this means that the closing speed in the region of the bottom 3010 is slower than in the region of the side wall 3020, as less water escapes from the material of the preform there per distance travelled (stroke) by the hot-pressing device 610.

In the case of the hot-pressing device 610 shown, the closing can be effected according to the water escaping adapted to the surface temperature of the contact surfaces 676. At the beginning of a hot-pressing process, for this the contact surfaces 676, 696 must have the desired temperature, which is generally much higher than the boiling temperature of the liquid escaping or the water. In the embodiment example, the contact surfaces 676, 696 can be heated to up to 280° C. During the closing of the hot-pressing device 610, an evaporation of the liquid contained in the preforms can thus be effected immediately because the surface temperature of the contact surfaces 676 and contact surfaces 696 in the cavity is sufficiently hot. The closing speed is geared to the energy content, close to the surface, of the contact surfaces 676, 696 of the cavities. For the determination of the boiling temperature, known values can be used or the pulp can be monitored with respect to its composition constantly or at definable intervals, with the result that the boiling temperature can hereby be ascertained. The control system in the control unit 310 thus obtains the boiling temperature of the liquid and regulates the closing of the hot-pressing device 610 according to the measured surface temperature of the contact surfaces 676, 696. Only when the contact surfaces 676, 696 lie in a tolerable temperature range can a hot-pressing operation be carried out by a relative displacement of the first tool component 640 and the second tool component 690.

During a hot-pressing operation, the squeezing out and evaporation of water, in particular the water bound in the fibers, starts after the second contact surfaces 696 have come into contact with a preform placed on the first contact surfaces 676, in the case of further displacement. In order to evaporate the water escaping a correspondingly high temperature at least of the contact surfaces 676 is required. The required temperature has to be at least as high as the boiling temperature of the liquid.

A closing, in stages, of the hot-pressing device 610 with holding points for definable holding times can be predefined constantly by the control unit 310. For this, at least the surface temperature on the contact surfaces 676 is monitored, which is decisive for whether an evaporation of the liquid can be effected. If, for example, the surface temperature on the contact surfaces 676 drops sharply, the closing speed must be either reduced or temporarily stopped, until an increase in the surface temperature is detected or no further drop is detected.

Of course, such a method can be ascertained in advance for particular product types. For the control of the hot-pressing method, the values ascertained from one or more test runs are then stored in a memory, which the control unit 310 accesses for the actuation of the hot-pressing device 610. A monitoring can be performed via temperature sensors. If there is found to be too great a deviation from expected target values, the control unit 310 can for example lengthen the cycle time or holding times.

In further embodiments, a linear stroke of the second tool component 690 is preferred during the closing of the hot-pressing device 610, wherein the displacement of the second tool component 690 can be actuated directly. This offers advantages with respect to reaching holding points and providing the closing force compared with a drive via a cam disc etc.

The temperature drop in the cavities remains the same relative to the starting temperature in the case of the same settings, which means that the higher the starting temperature is, the quicker the hot-pressing device 610 can be closed or the more excess water can evaporate in the closing operation.

The surface temperature of the cavities is substantially independent of the subsequent supply of heat via the heating cartridges 660, wherein the cyclic reheating is fed by the capacity of the respective cavity. The cycle time, i.e., the time which is necessary for a hot pressing of preforms for the production of finished products, is thus primarily dependent on the conductivity, the shape and the thermal capacity of the cavity, with the result that it is essentially not possible to influence the cycle time via a regulation of the heating cartridges 660.

For this reason, in addition to the provision of gas or gas mixture (for example ambient air) for the extraction by suction of released steam and for the alignment of the temperatures and pressures in the cavities, the closing of the cavities is also made dependent on the temperature prevailing on the surfaces of the first contact surfaces 676 and the second contact surfaces 696. Here, the boiling temperature of the pulp or of the liquid to be evaporated is taken into consideration. Steam generally forms in the cavities during the hot pressing. In further embodiments, because a secondary stream of gas mixture or gas is sucked in during the hot pressing, the temperature in the cavities can be aligned to a substantially identical temperature level in all cavities. Furthermore, a pressure alignment in the channels and also in the cavities is achieved via the sucking-in of gas mixture or gas, which ultimately results in a substantially uniform temperature level being reached in all cavities.

Finally, the closing of the hot-pressing device 610 can be effected according to the surface temperature on the contact surfaces 676 and 696, wherein the boiling temperature of the liquid which is contained in the preforms and is to escape by evaporation due to the hot-pressing operation is decisive for the closing speed. The pressures in each case prevailing within the cavities can additionally be taken into consideration in further embodiments. In embodiments with a connection to the environment for sucking in ambient air, the boiling temperatures are approx. 100° C. at a pressure of approx. 1 bar. In embodiments without such a sucking-in of ambient air, a greater negative pressure (for example 0.5 to 0.9 bar) can for example prevail in the cavities during the hot pressing, with the result that, in the case of lower surface temperatures on the contact surfaces 676 and 696, an evaporation of the liquid released by the pressing can be effected on the hot surfaces.

In further embodiments, the closing of the hot-pressing device 610 by relative displacement of the first tool component 640 and the second tool component 690 is not effected continuously, but rather in stages, wherein at least one holding point is provided, at which, after liquid has been squeezed out of the preforms, an evaporation of the liquid is effected on the hot surfaces of the contact surfaces 676 and 696. Here, a cooling of the surfaces of the contact surfaces 676 and 696 occurs. While the second tool component 690 pauses at the holding point, it is achieved on the one hand that the water escaping has sufficient time to evaporate, without a blocking occurring within the cavity due to a closing that is too fast, and on the other hand that the surfaces of the contact surfaces 676 and 696 can be at least partially reheated due to the thermal capacity of the molding devices.

In further embodiments, several holding points can be defined. The closing speed as well as the duration and number of the holding points can also be adapted and altered according to detected values (e.g., temperature etc.) during a hot-pressing operation.

In further embodiments, a constant measurement of the temperature on the contact surfaces 676 and/or 696 can be dispensed with, wherein cycle times as well as holding points and closing speeds ascertained in advance are for example used during the hot pressing. As the surface temperature on the contact surfaces 676 and 696 is in principle dependent on the heat storage capacity of the material used and the reheating, a cycle time can be reduced according to, for example, pauses between two successive hot-pressing operations. The reduction in the cycle time depends on the period of time between two successive hot-pressing operations.

Figure 6:
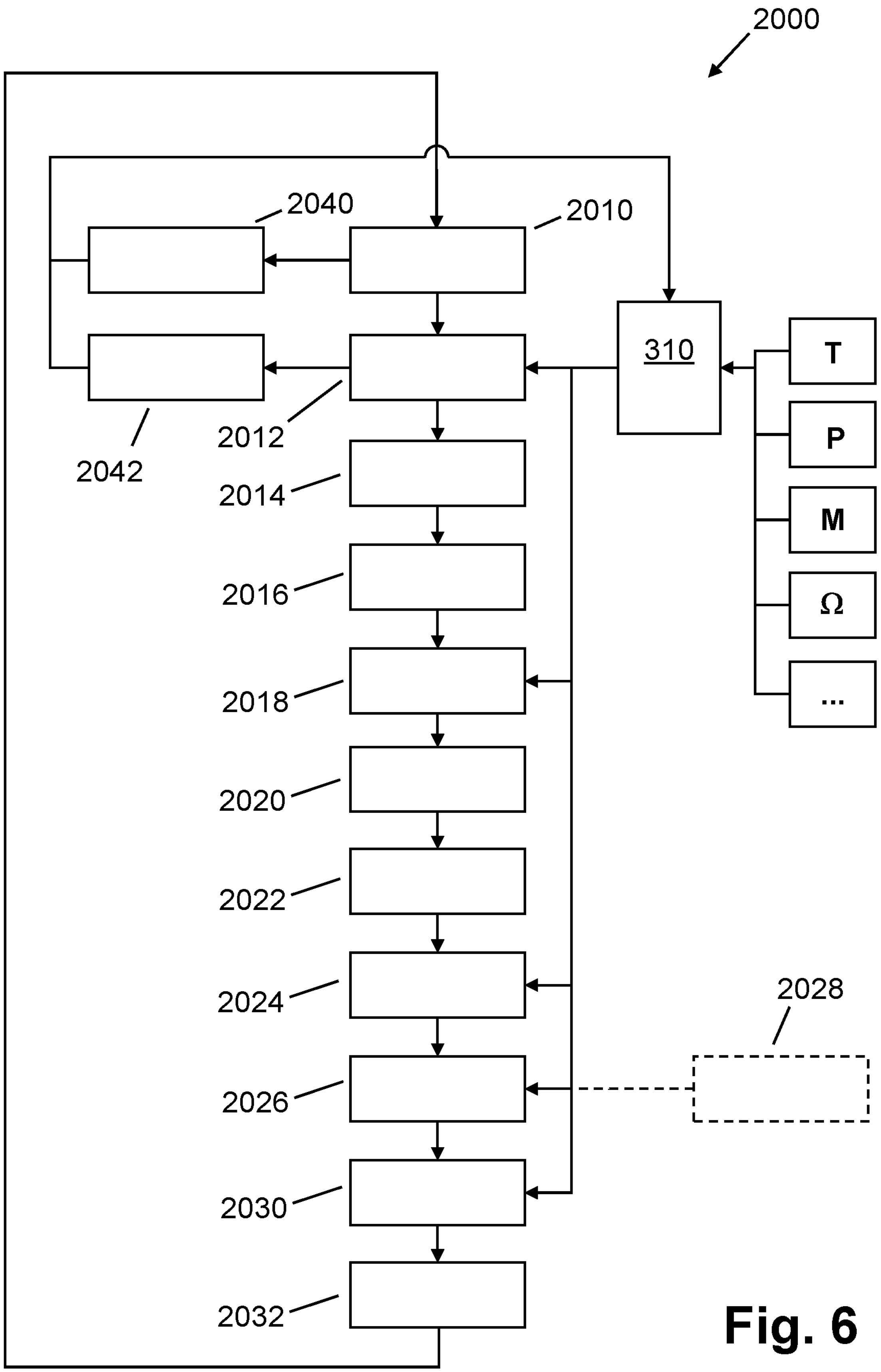
FIG. 6 depicts a method for producing products from a fibrous material.

FIG. 6 shows a method 2000 for the production of products from a fibrous material using the components described above as well as a fiber molding facility 1000. In the method 2000, in further embodiments, individual steps can be omitted or carried out in a different order provided it continues to be ensured that the aims and advantages described herein are achieved.

In a first method step 2010, the provision of pulp with a fiber content of from 0.5 to 10 wt. % in an aqueous solution is effected via a pulp tank 200 of the fiber molding facility 1000 or a separate fiber preparation facility. The pulp is either already located in the pulp tank 200 or supplied to the fiber molding facility 1000 via corresponding interfaces and lines the pulp tank 200. For this, the control unit 310 can regulate the supply of pulp from a remote fiber preparation facility according to the fill level of the pulp tank 200.

In a method step 2040, the composition of the pulp can be monitored continuously or at definable time intervals via corresponding sensors, and from this the boiling temperature of the pulp can be determined. This information is transmitted to the control unit 310, which stores the information in a memory and/or uses it for the regulation of the closing speed of the hot-pressing device 610 and for the determination of the number and duration of holding points during the closing of the hot-pressing device 610. The information obtained can also be used for the determination of a residual moisture content at various stages of the procedure.

In a method step 2012, the hot-pressing tool is heated up, wherein both the first tool body 642, and the molding devices 670 arranged thereon, and the second tool body 692, and the molding devices 694 arranged thereon, are heated uniformly via temperature control devices, such as for example heating cartridges 660.

In a method step 2042, the surface temperatures of the contact surfaces 676 and/or 696 can be measured continuously or at definable intervals via temperature sensors 680, 681, 682 or reference values can be measured or the surface temperatures can be determined according to temperature progressions detected in advance via the control unit 310 during the hot pressing.

In a method step 2014, the suction tool is dipped into the pulp according to the products to be manufactured.

In a method step 2016, fibrous material from the pulp is then sucked in via the suction device 320, which is correspondingly regulated by the control unit 310. Valves in at least one supply line between the suction device 320 and the preforming molds of the suction tool can additionally be regulated via the control unit 310.

In a method step 2018, a pre-pressing of the fibrous material is then effected in the preforming molds and the pre-pressing molds after fibers have been sucked in and the suction tool has been moved to the pre-pressing station 400.

In a method step 2020, the pre-pressed preforms are then introduced, via the robot 500, into the first molding devices 670 which are arranged on the first tool body 642, wherein for this the first tool body 642 was moved out of the molding station 600 in the manner described above. The pre-pressed preforms are then placed on the first molding devices 670, wherein after the placing a negative pressure for holding the preforms is interrupted. The preforms thus come into contact with the first contact surfaces 676 of the first molding devices 670. After this, the first tool body 642, together with the preforms placed on the first molding devices 670, is moved back into the molding station 600.

In a method step 2022, a closing of the hot-pressing device 610 is then effected according to detected reference values, measured temperatures and/or times and holding points determined in advance, wherein the closing of the hot-pressing device 610 is adapted to the surface temperature of the contact surfaces 676, 696 according to the boiling temperature of the liquid contained in the preforms.

In a method step 2024, via the extraction device 320 an extraction by suction of liquid escaping and/or of steam which forms due to evaporation of the liquid escaping on the hot contact surfaces 676 and 696 is effected via the first openings 678, the second channels 652 and the first channels 646. The extraction by suction is effected during the pressing by controlled displacement of the second tool component 690 in the manner described above.

In a method step 2026, during the extraction by suction of steam, a sucking-in of a gas mixture or a gas (for example ambient air) is effected via second openings, for example second channels 652, with the result that an alignment of the temperatures in the cavities occurs due to the pressure equalization in the channels and the cavities.

In further embodiments, in a method step 2028, a regulation of the opening of valves 656 in the second channels 652 can be effected, wherein the valves 656 regulate the quantity of gas mixture or gas supplied or sucked in according to detected temperatures, so that a pressure equalization and a temperature alignment occur in the cavities.

Alternatively, through the provision of a secondary stream at a higher pressure via the second openings, a "blowing out" of the steam can be effected, wherein the steam is entrained.

In a method step 2030, an opening of the hot-pressing tool by relative displacement of the second tool component 690 from the first tool component 640 is effected after the hot pressing of the preforms, which are then present as finished products and have a moisture content of, for example, 5 wt.-%. Moreover, after the opening, a displacement of the second tool body 692 via a rail system and an associated drive is effected in the manner described above, wherein the finished products remain in the upper tool.

After the upper tool body 692 has been moved, the products are deposited on the conveyor belt of the conveying device 800 in a method step 2032, wherein for this the negative pressure in the second molding devices 694 is interrupted.

The process described above is then run through again, wherein, during the continuous production of products from fibrous material, a production is effected such that a processing can be effected simultaneously in every station.

As indicated in FIG. 6, during the production of products from fibrous material in the individual method steps 2012, 2018, 2024, 2026 and 2030, according to the detected and/or determined temperatures, as well as pressures prevailing in the cavities, the channels and, for example, supply lines to the extraction device 320, the weight of preforms and/or the finished products and/or the electrical conductivity of the preforms and/or the finished products, the control unit 310 can draw conclusions about the respective processing state and correspondingly influence and alter the named method steps with respect to duration, speed and, for example, temperature, in order to obtain cycle times as short as possible during the hot pressing without wasting resources and damaging preforms and/or products.

Figure 7A:
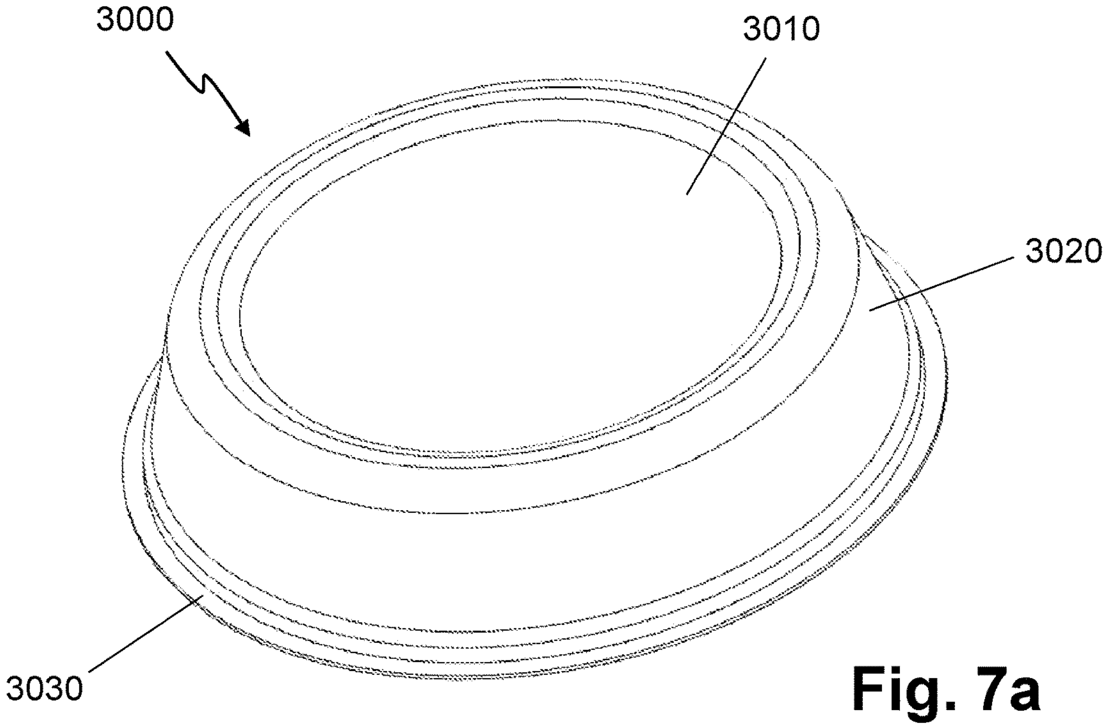
FIGS. 7*a, b* depict various representations of a bowl as finished product made of a fibrous material, produced according to a production process described herein.

FIGS. 7*a, b* show various representations of a bowl 3000 as finished product made of a fibrous material, produced according to a production process described herein. After the hot pressing, such a bowl 3000 has, for example, a residual moisture content of, for example, from 1 to 7 wt.-%.

Figure 7B:
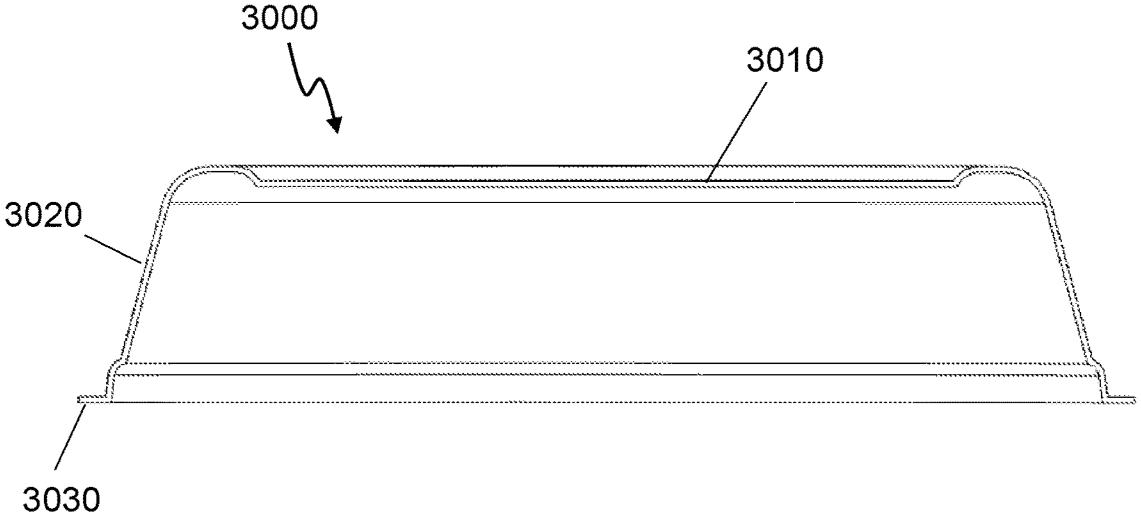

FIG. 7*a* shows a perspective representation of the bowl 3000 and FIG. 7*b* shows a sectional view of the bowl 3000. The bowl 3000 has a bottom 3010 and a circumferential side wall 3020, extending out from the bottom 3010, which runs relatively steeply out from the bottom 3010. A circumferential rim 3030, which runs substantially parallel to the bottom 3010, extends at the upper end of the side wall 3020.

In the embodiment example shown, the wall thickness of the bowl 3000 is the same size everywhere, in the bottom 3010, in the side wall 3020 and in the rim 3030. The wall thickness is predefined by the cavity, when the first contact surfaces 676 and the second contact surfaces 696 are at the smallest distance from each other during the hot-pressing operation.

LIST OF REFERENCE NUMBERS

100 frame
200 pulp tank
300 supply units
310 control unit
320 extraction device
400 pre-pressing station
500 robot
600 molding station
602 movement direction
610 hot-pressing device
620 base frame
622 tool table
624 interface
626 guide rod
628 upper tool table
630 knuckle joint press
632 yoke
640 first tool component
642 first tool body
644 board
646 first channel
648 molding channel
650 connecting unit
652 second channel
653 channel section
654 second connection
656 valve
658 recess
660 heating cartridge

662 screw
670 molding device
672 base
674 mold
676 first contact surface
678 first opening
680 first temperature sensor
681 second temperature sensor
682 third temperature sensor
690 second tool component
692 second tool body
694 second molding device
696 second contact surface
700 HMI panel
800 conveying device
810 camera
900 stacking device
910 gripper
1000 fiber molding facility
2000 method
2010 method step
2012 method step
2014 method step
2016 method step
2018 method step
2020 method step
2022 method step
2024 method step
2026 method step
2028 method step
2030 method step
2032 method step
2040 method step
2042 method step
3000 bowl
3010 bottom
3020 side wall
3030 rim

What is claimed is:

1. A method for hot pressing preforms from a fiber-containing material using a hot-pressing device, wherein a first tool component has a first tool body and at least one first molding device and a second tool component has a second tool body and at least one second molding device formed complementary to the at least one first molding device, having the following steps:

providing at least one preform made of fiber-containing material;

heating at least the first tool body and the at least one first molding device via at least one first temperature control device;

placing the at least one preform on first contact surfaces of the at least one first molding device;

moving the second tool component relative to the first tool component, wherein the at least one preform comes into contact with second contact surfaces of the at least one second molding device;

measuring a surface temperature on at least one of the first contact surfaces and the second contact surfaces;

controlling a closing speed of the moving of the second tool component relative to the first tool component during the hot pressing, wherein controlling the closing speed includes adapting the closing speed according to the surface temperature; and pressing the first tool component and the second tool component until the first contact surfaces and the second contact surfaces form at least one closed cavity;

wherein the first tool component has:

the first tool body, wherein the first tool body has, on at least one side, the at least one first molding device, which has the first contact surfaces for a preform to be received, wherein the first tool body includes a thermally conductive material and has the at least one first temperature control device, which is configured to heat the first tool body and the at least one first molding device, wherein the at least one first molding device has, on the first contact surfaces for the preform to be received, first openings, which open into at least one first channel in the first tool body, wherein the at least one first channel from the first openings opens into at least one first connection, wherein at least one second opening is provided, which provides a fluidic connection to the first openings of the at least one first molding device separate from the at least one first connection; and wherein the second tool component has:

the second tool body made of the thermally conductive material and the second tool body has, on at least one side, the at least one second molding device, which is formed complementary to the at least one first molding device and has the second contact surfaces for the preform to be received, with a result that in each case one cavity for the preform to be received is formed between the first contact surfaces of the at least one first molding device of the first tool component and the second contact surfaces of the at least one second molding device of the second tool component when the first tool component and the second tool component are pressed against each other for the hot pressing of preforms;

wherein residual moisture evaporating as steam due to the heat input generated via the at least one first temperature control device and a pressure generated by pressing the first tool component and the second tool component is discharged from the at least one preform via at least the first openings, the at least one first channel and the first connection, wherein a gas or gas mixture with a water saturation that is different from the discharged steam is introduced during the discharge of the steam via the at least one second opening which provides the fluidic connection to the first openings of the at least one first molding device separate from the at least one first connection.

2. The method according to claim 1, wherein the gas or gas mixture is provided from surroundings of the first tool component or by a feed device, wherein a temperature and/or a pressure of the gas or gas mixture supplied via the at least one second opening at least in the at least one closed cavity are set by the feed device.

3. The method according to claim 1, wherein:

the evaporating residual moisture is sucked in via the at least one first connection at an absolute pressure of from 0.1 to 0.9 bar; and/or the gas or gas mixture is supplied via the at least one second opening at an absolute pressure of from 0.5 to 1.5 bar.

4. The method according to claim 1, further comprising heating the second tool body and the at least one second molding device with one or more second temperature control devices on the second tool component.

5. The method according to claim 1, wherein, on the second contact surfaces, the at least one second molding device has third openings, which open into at least one third channel in the second tool body, wherein the at least one third channel from the third openings opens into at least one third connection.

6. The method according to claim 1, wherein the at least one second opening is in a contact region between the at least one first molding device and the at least one second molding device.

7. The method according to claim 1, wherein the surface temperature is measured using one or more temperature sensors placed on at least one of the first contact surfaces and the second contact surfaces.

8. The method according to claim 1, further comprising controlling a takt time of the hot pressing according to the surface temperature measured on at least one of the first contact surfaces and the second contact surfaces.

* * * * *